(12) United States Patent
Eberlberger

(10) Patent No.: US 12,703,447 B2
(45) Date of Patent: Aug. 11, 2026

(54) TELESCOPIC SEATPOST

(71) Applicant: Lupaan GmbH, Linz (AT)

(72) Inventor: Lukas Eberlberger, Enns (AT)

(73) Assignee: LUPAAN GMBH, Linz (AT)

( * ) Notice: Subject to any disclaimer, the term of this patent is extended or adjusted under 35 U.S.C. 154(b) by 1010 days.

(21) Appl. No.: 17/680,994

(22) Filed: Feb. 25, 2022

(65) Prior Publication Data

US 2022/0266937 A1 Aug. 25, 2022

Related U.S. Application Data

(63) Continuation of application No. PCT/AT2020/060322, filed on Aug. 28, 2020.

(30) Foreign Application Priority Data

Aug. 30, 2019 (AT) .............................. A 50757/2019

(51) Int. Cl.
*B62J 1/06* (2006.01)
*B62J 1/08* (2006.01)

(52) U.S. Cl.
CPC . *B62J 1/06* (2013.01); *B62J 1/08* (2013.01); *B62J 2001/085* (2013.01)

(58) Field of Classification Search
CPC ........... B62J 2001/085; B62J 1/06; B62J 1/08
USPC ..................................................... 297/215.13
See application file for complete search history.

(56) References Cited

U.S. PATENT DOCUMENTS 3,891,236 A * 6/1975 Kuwano .................... B62J 1/06 267/132
6,206,396 B1 3/2001 Smith
6,349,957 B2 2/2002 Smith
(Continued)

FOREIGN PATENT DOCUMENTS

CA 2959649 C * 9/2023 ................ B62J 1/02
WO 2016/029301 3/2016
(Continued)

OTHER PUBLICATIONS

International Search Report issued Dec. 3, 2020 in International (PCT) Application No. PCT/AT2020/060322.

*Primary Examiner* — Jose V Chen
(74) *Attorney, Agent, or Firm* — Wenderoth, Lind & Ponack, L.L.P.

(57) ABSTRACT

A telescopic seatpost for supporting a bicycle saddle includes a support unit to be secured on or in the frame of a bicycle; a telescoping unit to be moved in a guided manner relative to the support unit within a specified telescoping range, the telescoping range extending from a minimum length of the seatpost to a maximum length of the seatpost; and a coupling device arranged between the telescoping unit and the support unit. A coupling device part which is paired with the support unit is connected to the support unit in a fixed manner, and the telescoping unit can be coupled to the support unit via the coupling device. A blocking device releasably blocks the guided telescoping movement of the telescoping unit relative to the support unit. The coupling device has an adjustment mechanism via which the maximum length of the seatpost can be adjusted, an axial force which acts on the telescoping unit being transmitted to the support unit via the coupling device.

21 Claims, 27 Drawing Sheets

(56) References Cited

U.S. PATENT DOCUMENTS 7,025,522 B2 * 4/2006 Sicz ........................ B62K 19/36 403/379.5
8,191,964 B2 * 6/2012 Hsu ........................ B62K 19/36 280/288.4
8,317,261 B2 11/2012 Walsh
8,398,104 B2 * 3/2013 Hsu ........................ B62J 1/08 280/220
8,833,786 B2 9/2014 Camp et al.
9,272,745 B2 3/2016 Camp et al.
9,540,063 B1 * 1/2017 Shirai ........................ B62J 1/08
9,580,124 B2 * 2/2017 Shirai ........................ B62K 19/36
9,957,008 B1 * 5/2018 Tsai ........................ B62J 1/08
10,189,522 B2 1/2019 Pittens et al.
10,752,307 B2 8/2020 Eberlberger
11,077,901 B2 8/2021 Pittens et al.
11,649,003 B2 * 5/2023 Hara ........................ B62J 45/421 297/215.13
11,661,130 B2 * 5/2023 Quenzer ........................ B62J 1/08 297/215.13
2001/0026059 A1 10/2001 Smith
2012/0006949 A1 * 1/2012 Laird ........................ F16C 1/12 248/161
2012/0104810 A1 * 5/2012 Walsh ........................ B62K 19/36 297/215.13
2013/0093231 A1 * 4/2013 Hsu ........................ A47C 3/40 297/344.19
2013/0118847 A1 5/2013 Krahenbuhl et al.
2013/0119634 A1 5/2013 Camp et al.
2014/0061419 A1 * 3/2014 Wehage ........................ B62J 1/06 248/404
2015/0151804 A1 6/2015 Camp et al.
2017/0274949 A1 9/2017 Pittens et al.
2018/0127041 A1 * 5/2018 Tsai ........................ F16F 9/52
2018/0273123 A1 * 9/2018 Eberlberger ........ F16H 25/2015
2019/0106171 A1 * 4/2019 Eberlberger ........... B62K 19/36
2019/0111986 A1 4/2019 Pittens et al.
2019/0300084 A1 * 10/2019 Ahnert ........................ F16F 15/067
2019/0300085 A1 * 10/2019 Shirai ........................ B62J 1/08
2019/0301497 A1 * 10/2019 Jordan ........................ F15B 15/16
2019/0308681 A1 * 10/2019 Staples ........................ B62J 1/08

FOREIGN PATENT DOCUMENTS

WO WO-2016029301 A1 * 3/2016 ................ B62J 1/02
WO 2017/011848 1/2017

* cited by examiner

B
B
17
10
9
3
1
x1
C
C
18
13

D-D
17
23
31
3
7
6
1
12
8
4
16
15
2
14
L
L
5
18
13

C-C
1
D
8
16
19
13
20
18
22
4
21
D
12

D - D
1
31
12
7
16
8
4
21
22
15

H
H
10
9
3
x2
J
J
1
18
13

K-K
23
12
7
6
3
8
4
1
15
2
14
18
13

H-H
1
17
16
23
10
20
13
18
9
31

J - J
1
K
16
22
4
8
21
19
13
20
18
K

M
M
10
9
3
L
L
X3
1
18
13

N-N
7
12
3
8
4
15
16
1
18
13

H - H
23
20
16
1
17
13
10

L-L
1
12
8
16
N
N
4
21
22
18
13
20
19

Fig. 3e
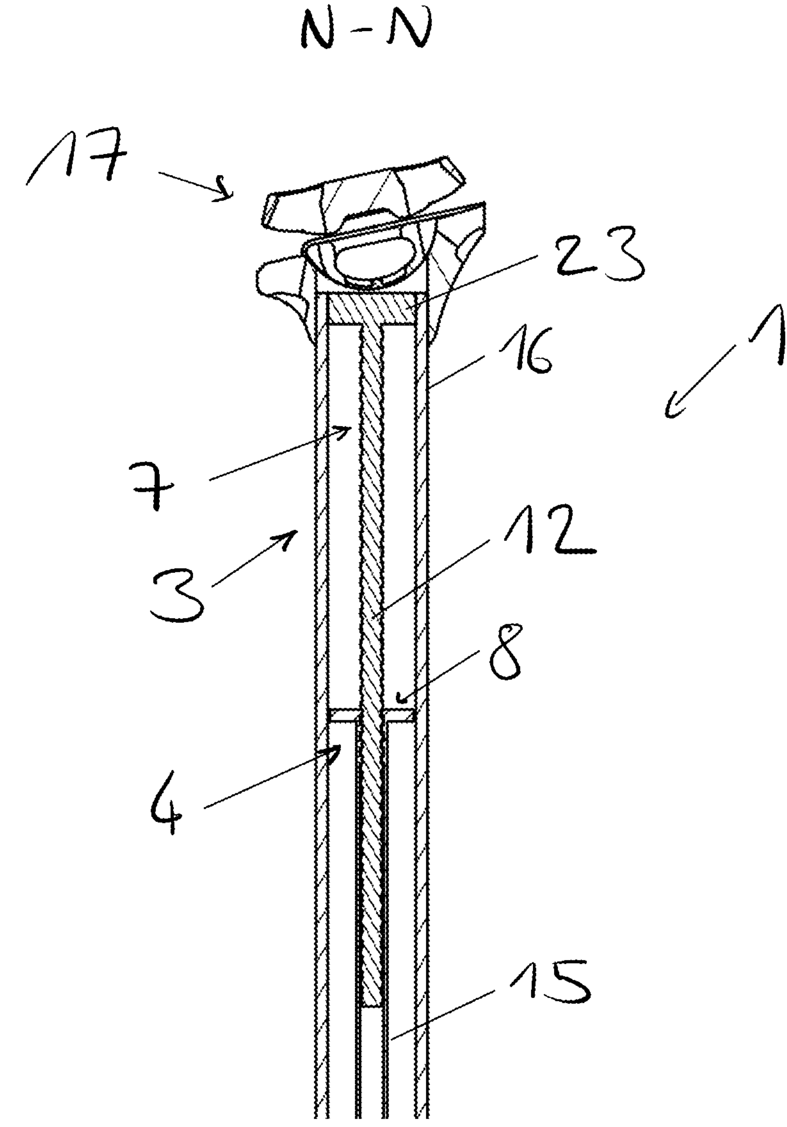
N-N
17
23
16
1
7
12
3
8
4
15

17
A
A
10
9
x4
3
B
B
1
18
13

D-D
17
10
31
24
16
11
6
3
8
7
4
14
L
L
1
2
15
29
5
18
13

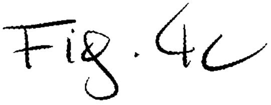
Fig. 4c
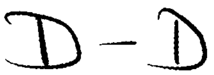
D-D
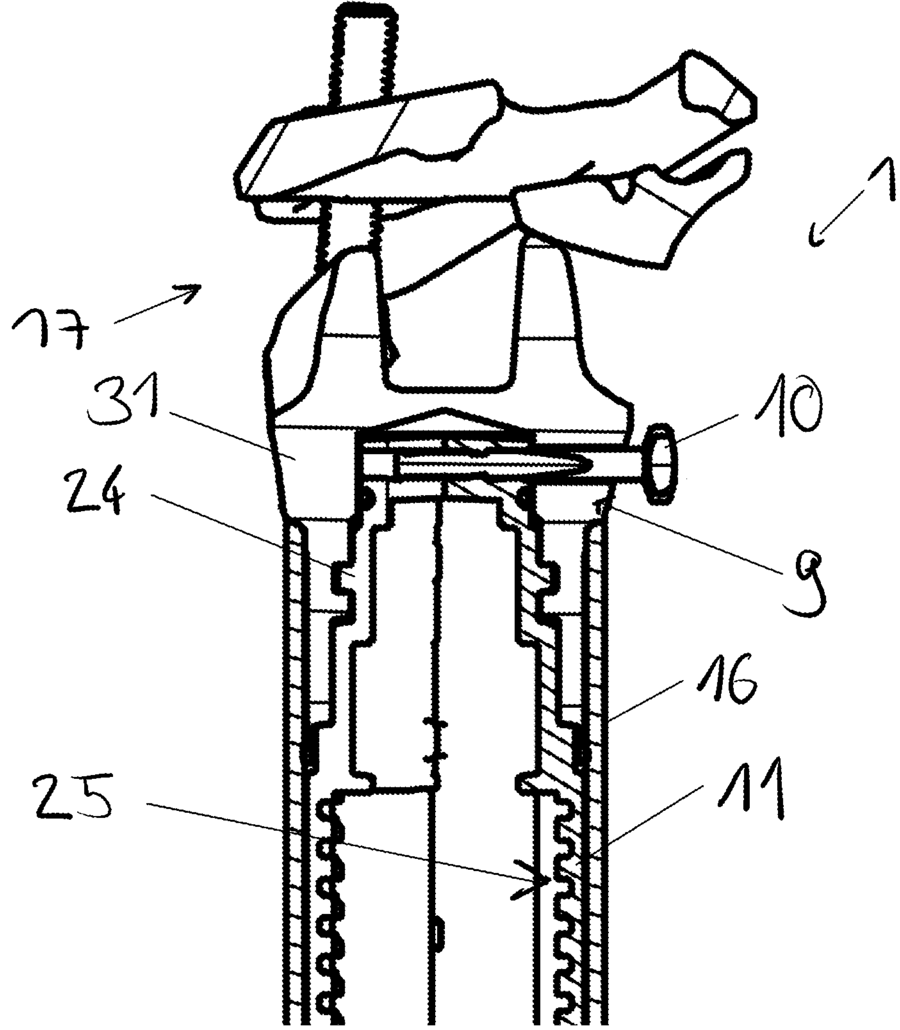
1
17
31
10
24
9
16
25
11

D-D
11
1
7
25
4
16
26
3
8
14
18

L - L
1
27
29
16
30
18
14
13
15

17
E
E
9
10
x5
3
F
F
1
18
13

G - G
10
9
24
11
16
7
3
8
1
14
2
29
18
15

G-G
1
17
10
24
9
11
16
3

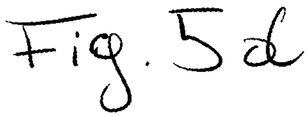
Fig. 5d
G-G
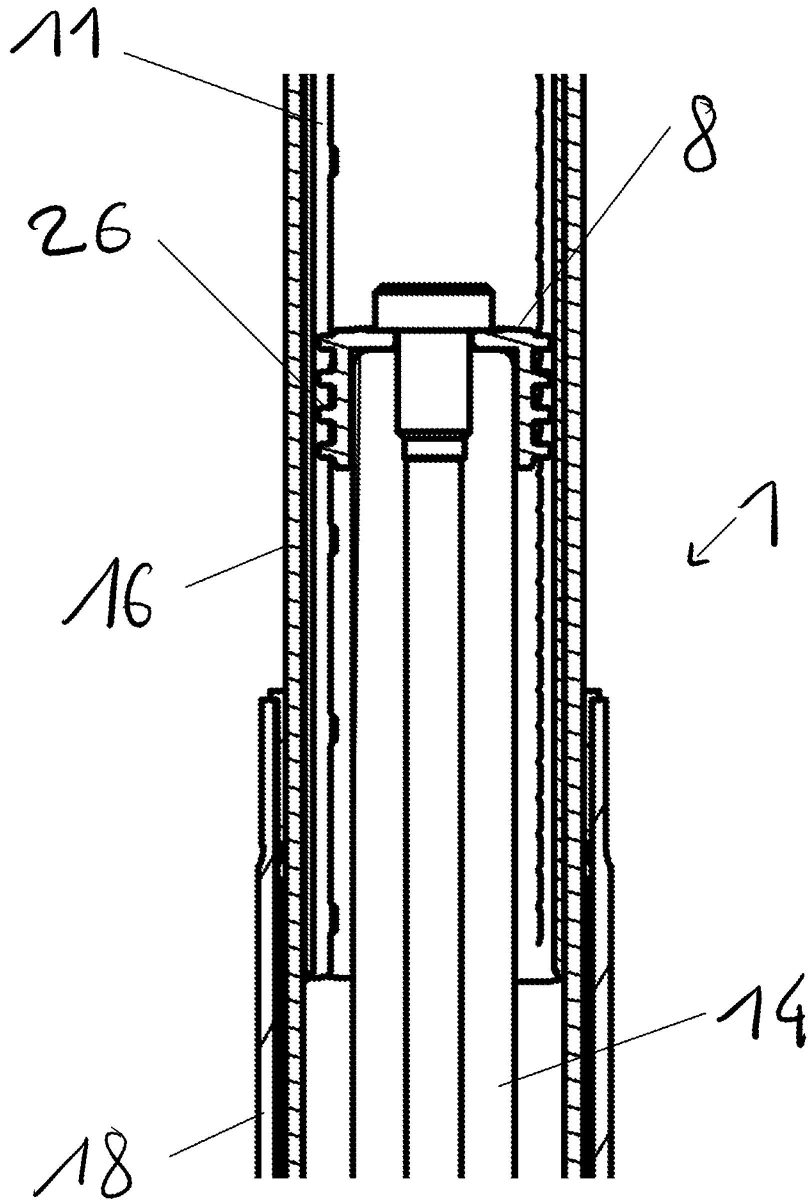
11
8
26
1
16
14
18

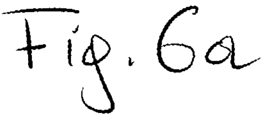
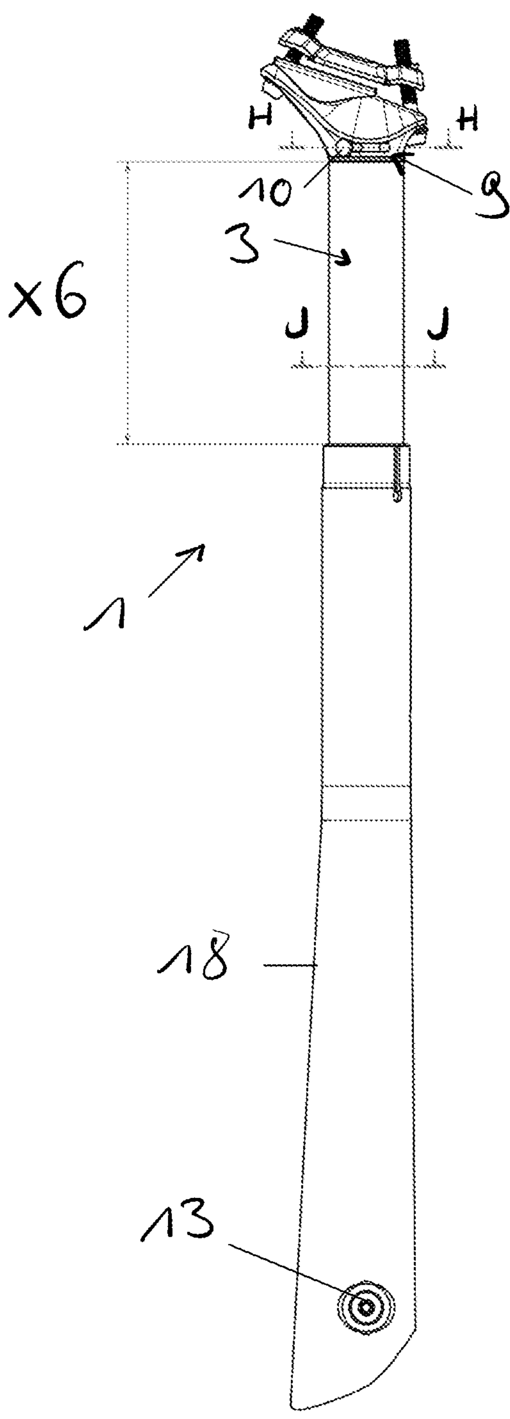
Fig. 6b
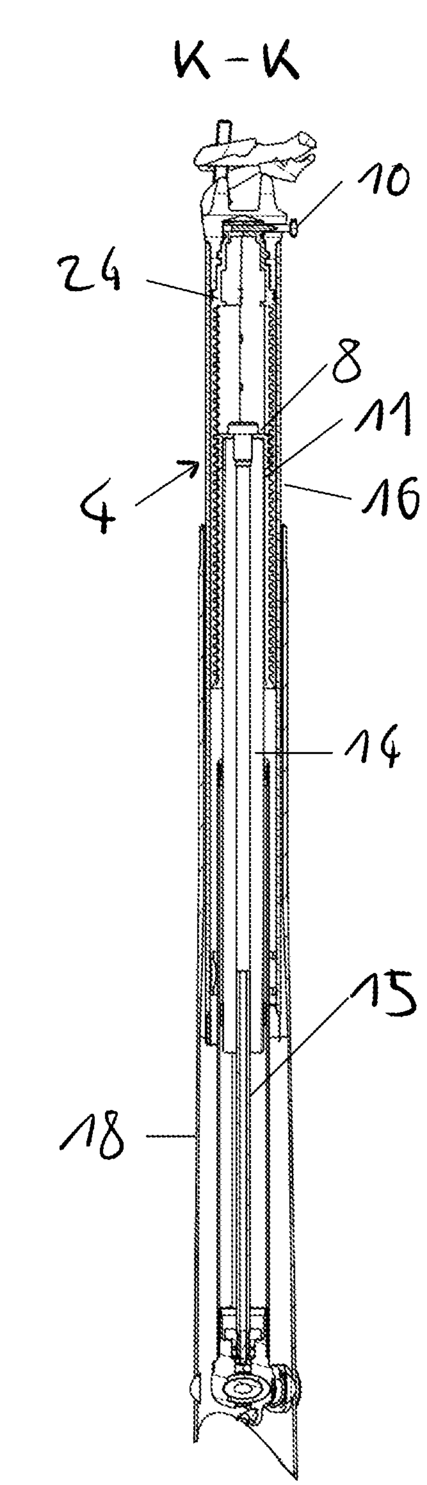

K-K
17
1
10
24
9
16
11
25
4
26
8
14
18

H-H
25
17
1
9
10
16

J-J
K
1
25
11
8
26
18
16
26
25
K 26
16
1
D
25
25
11
8
D
26

26
16
25
1
G
8
25
G
26
11

TELESCOPIC SEATPOST

BACKGROUND OF THE INVENTION

Telescopic seatposts are generally known in the state of the art, by means of which the position of a saddle mounted by the seatpost which is installed in the frame of a bicycle is displaceable relative to the frame of the bicycle within a telescopic range. In that case, in relation to the seatpost itself, the telescopic range extends from a minimum longitudinal extent of the seatpost (retracted state) to the maximum longitudinal extent of the seatpost (extended state). In that case, the seatpost is usually so arranged or mounted in the frame of the bicycle that the desired saddle height in the extended state (for example the measured distance from the center of the bottom bracket of the bicycle to the upper edge of the saddle) is afforded at the maximum longitudinal extent of the seatpost.

WO 2017/011848 A1 to the present applicant discloses a telescopic seatpost with a telescopic element and a support element which can be connected to the seat tube of a frame of a bicycle by way of a fixing portion. A desired saddle height in the extended state of the seatpost is set by way of a latching element which is fixed to the support element and which allows positioning of the telescopic element relative to the support element. A telescopic movement of the telescopic element relative to the support element, that is to say the telescopic movement for retracting and extending the seatpost when the bicycle is being ridden can be enabled or arrested by a separately provided arresting device. Forces acting from the saddle on the telescopic element are transmitted into the support element by way of the arresting device. A disadvantage in that respect is that, in the inner region substantially over the entire longitudinal extent of the telescopic element, the telescopic element has to be of a specific configuration in the form of radial grooves and that involves increased machining complication and expenditure in production of the telescopic element and possibly entails disadvantages in regard to the strength thereof. In addition, the configuration of the latching element has to correspond to the configuration of the arresting device as both adjustment mechanisms cooperate with the radial grooves in the telescopic element.

Likewise the configuration of the telescopic element is tied to the configuration of the latching element and the arresting device.

SUMMARY OF THE INVENTION

The object of the invention is to provide a telescopic seatpost in which the above-discussed disadvantages do not occur.

The invention concerns a telescopic seatpost for mounting a bicycle saddle, comprising a support unit which can be fixed to or in a frame of a bicycle, and a telescopic unit moveably guided within a predetermined telescopic range relative to the support unit. The telescopic range extends from a minimum longitudinal extent of the seatpost to a maximum longitudinal extent of the seatpost.

The telescopic range is the range of possible extension and retraction of the seatpost while the bicycle is being ridden and is substantially independent of the setting of the maximum longitudinal extent of the seatpost. Adjustment of the maximum longitudinal extent of the seatpost—and linked thereto, the adjustment of the minimum longitudinal extent of the seatpost—can substantially correspond to adaptation of the height of the saddle to the body size or leg length of a rider.

The telescopic unit can substantially correspond to that part of the seatpost, which depending on the retraction or extension position project visibly from the exterior out of the bicycle frame when the seatpost is fitted in such a bicycle frame.

The support unit can be fixed at an end to the bicycle frame, in particular the seat tube of the bicycle frame in the region of the bottom bracket, and basically can serve for transmitting an axial force or torque exerted on the saddle and/or the telescopic unit into the bicycle frame.

A coupling device arranged between the telescopic unit and the support unit is provided for coupling the telescopic unit to the support unit. In that case, a part of the coupling device associated with the support unit is fixedly connected to the support unit.

The coupling device can generally have a part associated with the telescopic unit and a part associated with the support unit.

A blocking device is provided for releasably blocking the guided telescopic movement of the telescopic unit relative to the support unit. In the blocked state, a telescopic movement of the telescopic unit relative to the support unit is prevented by the blocking device. Release of the blocking device allows retraction and extension of the telescopic unit within the telescopic range of the seatpost, as is desired while the bicycle is being ridden.

By virtue of the combination of the features that the coupling device has an adjustment mechanism, by way of which the maximum longitudinal extent of the seatpost is adjustable, and an axial force acting on the telescopic unit is transmitted to the support unit by way of the coupling device the telescopic unit can be substantially independent of the support unit and in particular substantially independent of the blocking device.

Adjustment of the maximum longitudinal extent of the support post, in particular for adaptation of the height of a mounted saddle to the body size or leg length of a rider, can be effected by way of the adjustment mechanism of the coupling device. In that case, it is possible for a relative position of the telescopic unit to be established relative to the coupling device by the adjustment mechanism.

The term axial force is used to denote a force or force component which acts in the direction of a longitudinal axis of the telescopic unit and/or the support unit.

Particularly in a blocked state of the blocking device, a force acting axially on the telescopic unit can, for example, be a force generated by the body weight of a rider sitting on the saddle of the bicycle. In other words, therefore, a force due to weight or a force exerted manually on the saddle or the telescopic unit. Likewise in the blocking-released state, a telescopic movement, for example for retraction and/or extension of the seatpost, can be driven by such a force or forces.

A force acting axially on the telescopic unit can, for example, also be a force originating from a force storage means. That can be, for example, a force driving the telescopic movement, such as a restoring force for retraction and/or extension of the seatpost.

Generally, forces acting axially between the telescopic unit and the support unit can be transmitted by the coupling device. Substantially the entire axial force acting on the telescopic unit can be transmitted to the support unit by the coupling device.

In that case, the telescopic unit can advantageously be coupled to the support unit at at least two different coupling positions by way of the adjustment mechanism. In that way, the adjustment mechanism can permit at least two settings of the maximum longitudinal extent of the seatpost. It is not to be excluded that the telescopic unit can be coupled to the support unit at a plurality of different coupling positions by way of the adjustment mechanism.

In an embodiment, the telescopic unit can be tubular and the support unit and/or the coupling device can be arranged at least partially within the telescopic unit, in particular in the interior of a hollow space formed by the tubular telescopic unit.

In an advantageous embodiment, the adjustment mechanism of the coupling device can have an adjustment part associated with the telescopic unit and have a profiled notching. The adjustment part can preferably be in the form of a sleeve, a toothed rack, or a spindle. The sleeve can be a cylindrical hollow body with a certain wall thickness, the inside surface of which has a profiled notching. The toothed rack or spindle can be a cylindrical body with external radial notchings.

The adjustment part can be connected to the telescopic unit in force-locking relationship for the transmission of axial forces.

The adjustment mechanism can further have a coupling part associated with the support unit and having a corresponding profiled notching. The profiled notchings of the coupling part can be of such a configuration that a positively locking connection is possible between the adjustment part and the coupling part. In that way, a positively locking connection of the telescopic unit to the support unit is made possible between the adjustment part and the coupling part.

The coupling part can be connected to the support unit in force-locking relationship for the transmission of axial forces.

The profiled notchings in the adjustment part and/or in the coupling part can in that case be in the form of a thread or in the form of radial grooves or radial projections. The thread, the radial grooves or the radial projections can have a peripherally limited configuration, for example in the form of an interrupted thread, or in the form of laterally or radially projecting projections which are provided portion-wise peripherally (the notchings can here too correspond to the removed material).

Preferably, the adjustment part is mounted rotatably in or on the telescopic unit, and the telescopic unit can be coupled to the support unit by a rotary movement of the adjustment part relative to the coupling part. The adjustment part can be moveable limitedly or unlimitedly.

In particular, a positively locking connection can be produced or released for the transmission of axial forces between the adjustment part and the coupling part by a rotary movement of the adjustment part relative to the coupling part.

In that case, the adjustment part can be mounted rotatably in an inner region of the tubular telescopic unit and can preferably be arranged coaxially with the telescopic unit.

In configurations in which the adjustment part is in the form of a sleeve, a spindle, or a toothed rack, the sleeve, the spindle, or the toothed rack can be arranged, in particular coaxially, in the inner region of the tubular telescopic unit. The sleeve, the spindle, or the toothed rack can be arranged in the telescopic unit rotatably and secured to prevent axial displacement.

It can generally be advantageous if the telescopic unit has an axial and/or radial opening, through which the coupling device is actuable from outside the telescopic unit, preferably by way of a lever. An axial and/or radial opening can be provided in the telescopic unit at an end thereof, that is the upper end in the mounted position and is towards the saddle, through which opening the coupling device, in particular the part of the coupling device that is associated with the telescopic unit, is actuable. In that arrangement a lever or an adjusting wheel can cooperate directly with the coupling device.

In an embodiment in which the adjustment part is mounted rotatably in or to the telescopic unit, the adjustment part of the coupling device can be rotatable relative to the telescopic unit through the axial and/or radial opening in the telescopic unit. In structures in which the adjustment part is in the form of a sleeve, a spindle, or a toothed rack, the sleeve, the spindle, or the toothed rack can be rotated relative to the telescopic unit through the axial or radial opening in the telescopic unit. In that case, a lever or an adjusting wheel can be connected to the sleeve, the spindle, or the toothed rack.

The coupling part of the coupling device can be mounted non-rotatably to the support unit. It is also possible that the coupling part itself cannot perform a translatory and/or rotary relative movement with respect to the support unit.

It can generally be advantageous if the coupling device is actuable independently of the blocking device.

The guided movement can be a positively guided translatory telescopic movement, that is restricted by the predetermined telescopic range, of the telescopic unit relative to the support unit. In particular, the telescopic unit and the support unit can be positively guided relative to each other in such a way that substantially only a possibly limited translatory movement relative to each other is possible.

A guide device with guidance means can be provided for guiding the telescopic movement of the telescopic unit relative to the support unit. The guidance means can be for example in the form of at least one groove extending in the longitudinal direction of the telescopic unit, in particular a telescopic tube of the telescopic unit, and at least one sliding block arranged on the support unit, or vice-versa. Such a groove can be possibly releasably closed at one end whereby it is possible to prevent complete extraction of the telescopic unit out of the seatpost.

The blocking device for releasably blocking the guided telescopic movement of the telescopic unit relative to the support unit can be hydraulic.

A hydraulic blocking device can allow stepless blocking of the telescopic movement.

The blocking device can be integrated in the support unit.

Transmission of an axial force acting on the telescopic unit to the blocking device of the support unit can be effected by the coupling device.

In a preferred configuration, the support unit can be a hydraulic cylinder operating with hydraulic fluid, and the blocking device can thus be integrated in the support unit.

For fixing the seatpost in or to a frame of a bicycle, the support unit can have a fixing device. The seatpost can be connected to the frame by the fixing device. Preferably, the seatpost is connected to the frame in a positively locking relationship by the fixing device, for example by a screw means.

It can be advantageous if the blocking device has a force storage means, preferably a pneumatic force storage means, for example in the form of a gas compression spring.

In a particularly preferred structure, the support unit can be a hydraulic cylinder operating with hydraulic fluid, with a gas compression spring.

BRIEF DESCRIPTION OF THE DRAWINGS

Further details and advantages of the present invention are described more fully hereinafter with reference to the drawings, in which:

FIGS. 5*a* through 5*f* are side and sectional views of a second embodiment of the seatpost, wherein the seatpost is in an uncoupled state with a longitudinal extent of the seatpost, that is reduced in relation to FIG. 4, FIGS. 6*a* through 6*e* are side and sectional views of a second embodiment of the seatpost, wherein the seatpost is in a coupled state with a longitudinal extent of the seatpost, that is reduced in relation to FIG. 4, and FIGS. 7*a* and 7*b* are a comparison of sectional views of a second embodiment of the seatpost in a coupled and an uncoupled state.

DETAILED DESCRIPTION OF THE INVENTION

Figures 1A, 1B:
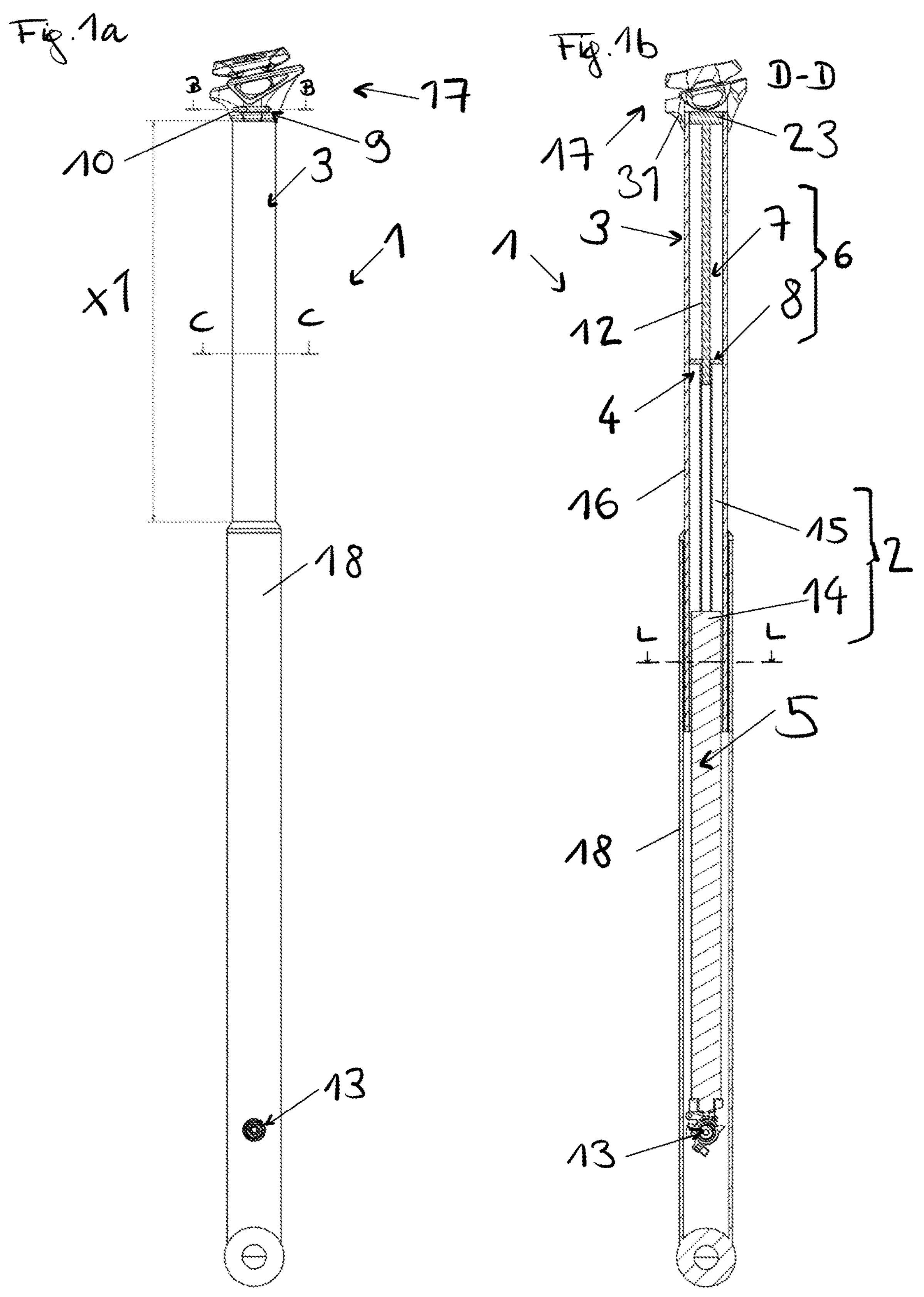
FIGS 1*a* through 1*f* are side and sectional views of a first embodiment of the seatpost, wherein the seatpost is in a coupled state with a substantially maximum longitudinal extent of the seatpost.

FIG. 1*a* shows a first embodiment of a seatpost 1 arranged in the seat tube of a frame 18. The telescopic unit 3, which partially projects out of the frame 18 and has a saddle clamp 17 for mounting a bicycle saddle, is visible from the exterior. The seatpost 1 is connected to the frame 18 by way of the fixing device 13. In the illustrated embodiment, the telescopic unit 3 has a radial opening 9 through which the coupling device 4 (see also FIG. 1*b*) can be actuated from outside the telescopic unit 3 by a lever 10 projecting out of the radial opening 9.

In this embodiment of the seatpost 1 the blocking device 5 is in the form of part of the support unit 2.

Figure 1C:
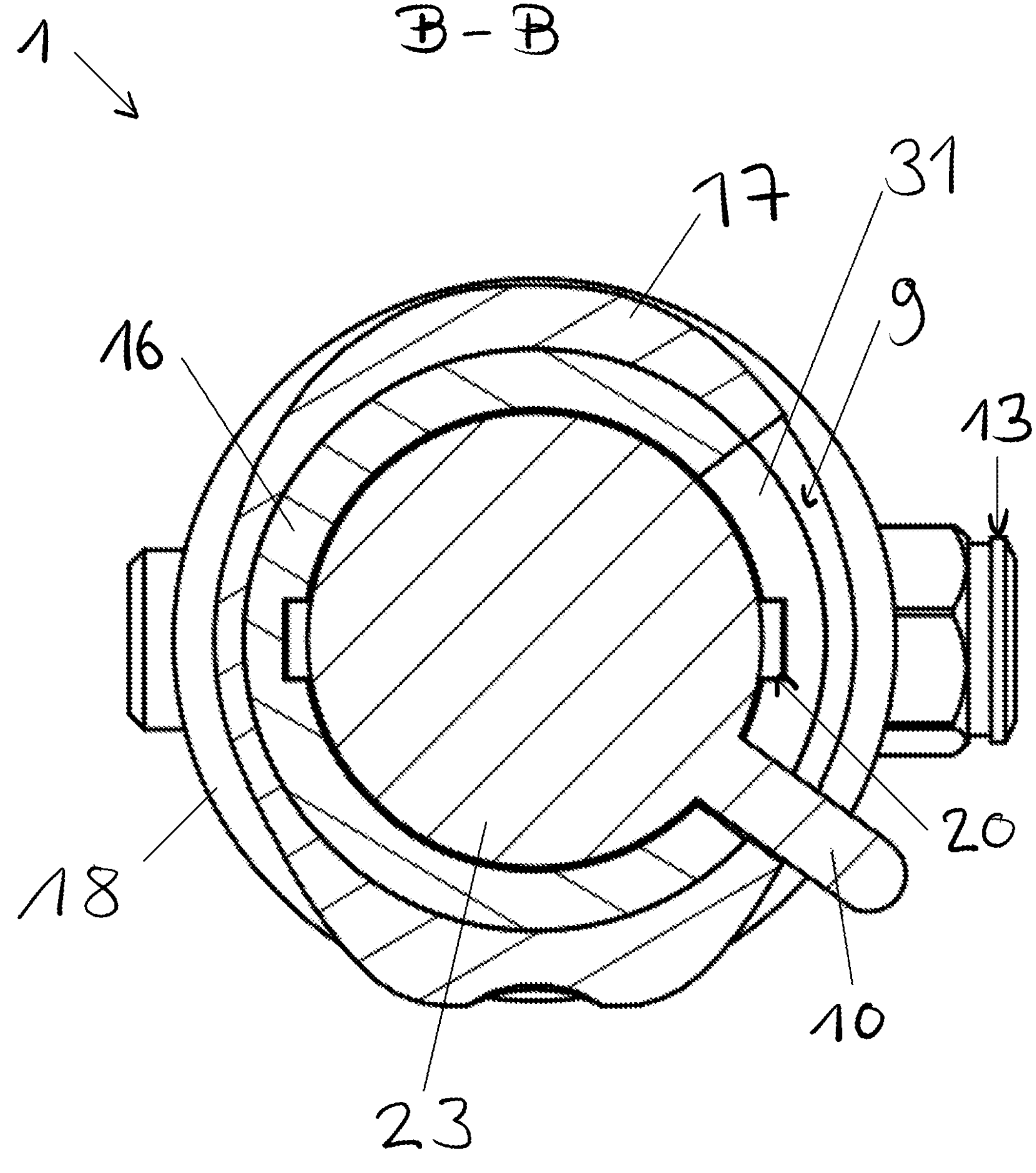
Figure 1D:
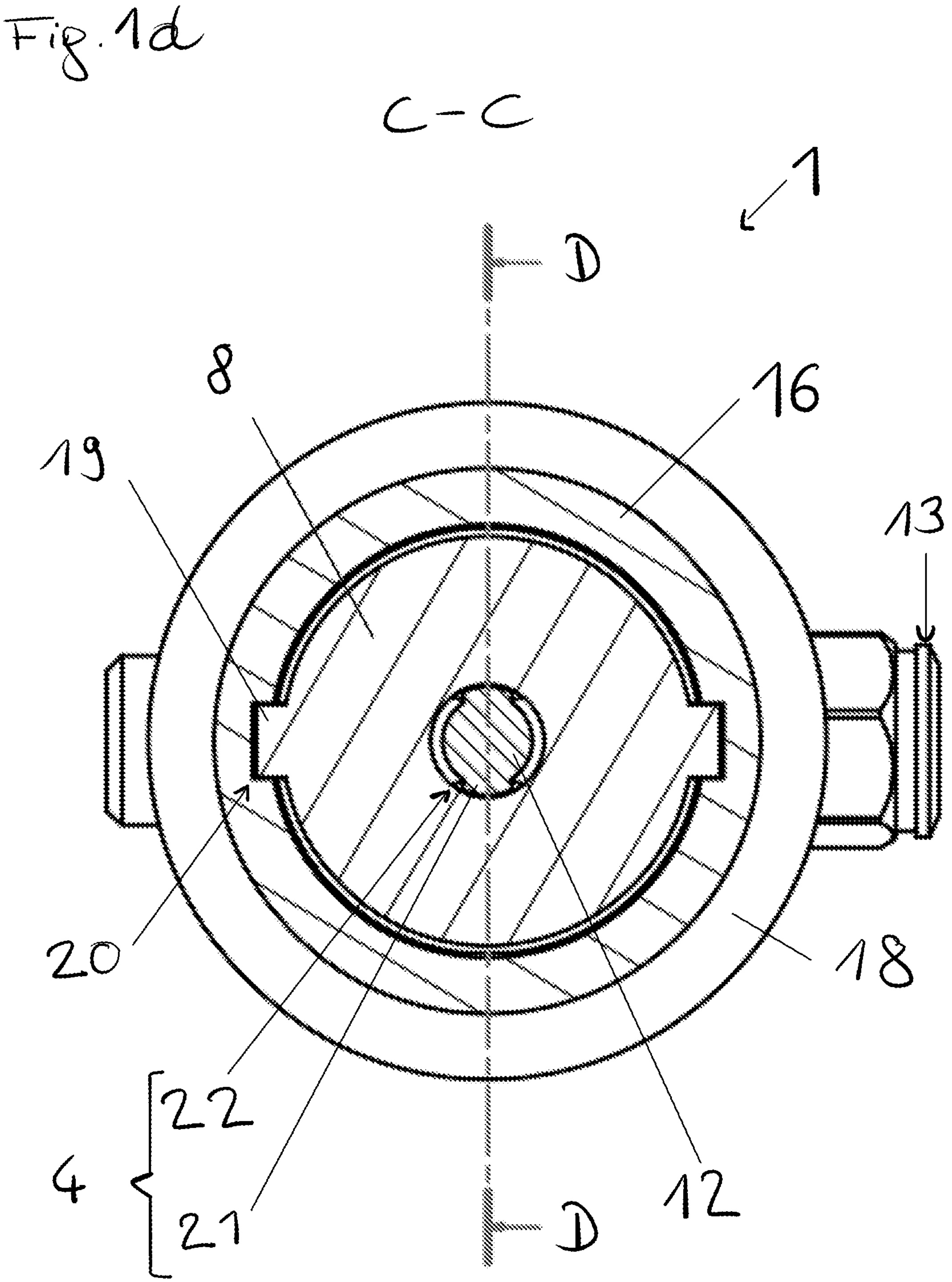
Figure 1E:
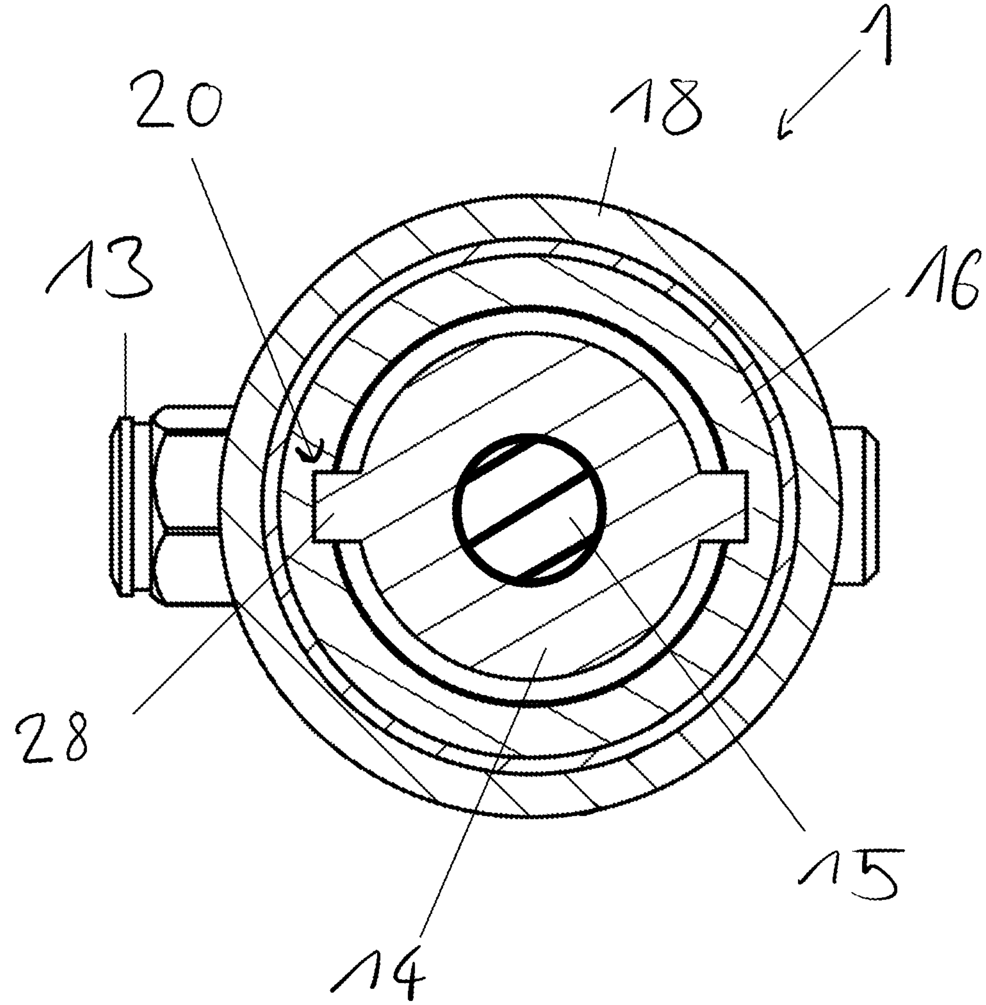

The sectional planes B-B, C-C and L-L shown in FIGS. 1*a* and 1*b* are shown in FIGS. 1*c*, 1*d* and 1*e* respectively.

FIG. 1*b* shows a sectional view along a longitudinal axis of the seatpost 1 of FIG. 1*a* (line D-D in FIG. 1*d*). A support unit 2 in a design configuration of a piston with piston rod 15, mounted in a cylinder 14, can be seen in the sectional view. Arranged between the telescopic unit 3 and the support unit 2 is a coupling device 4 (for closer details see FIG. 1*d*), by means of which the telescopic unit 3 is coupled to the support unit 2. In the illustrated embodiment the coupling device 4 has an adjustment mechanism 6 having an adjustment part 7 associated with the telescopic unit 3 in the form of a toothed rack 12 and a coupling part 8 associated with the support unit 2. The adjustment part 7 in the form of the toothed rack 12 is mounted coaxially and rotatably in an inner region of the telescopic unit 3 which is of tubular configuration in the form of the telescopic tube 16. In this embodiment the adjustment part 7 is mounted in the head 31 of the telescopic unit 3 by way of the head 23 of the toothed rack 12 and is advantageously suited for the transmission of axially acting forces.

The seatpost 1 is disposed in a coupled state (see in that respect FIG. 1*d*) with substantially the maximum longitudinal extent of the seatpost 1 (characterised by the protrusion ×1 of the telescopic unit 3 out of the frame 18).

A comparison with FIG. 1*a* shows that in this embodiment the adjustment part 7 in the form of the toothed rack 12 of the adjustment mechanism 6 is rotatable relative to the telescopic unit 3 through the radial opening 9 in the telescopic unit 3. In that case the coupling part 8 is advantageously mounted non-rotatably to the support unit 2 and is also secured against rotation with respect to the telescopic unit 3 (see in that respect also FIG. 1*d*).

FIG. 1*c* shows a sectional view along the line B-B shown in FIG. 1*a*. In this case the section is from the exterior inwardly through the saddle clamp 17, the telescopic tube 16 and the head of the toothed rack 12. It is possible to see the opening 9 provided radially in the head 31 of the telescopic unit 3 and the lever 10 connected to the head 23 of the toothed rack 12. It is also possible to see, along the longitudinal axis of the telescopic tube 16, at the inside thereof, grooves 20 which are provided therein.

It can be provided that the grooves 20 in the telescopic tube 16 are releasably closed at the lower end of the telescopic tube 16 whereby unintended complete removal of the telescopic unit 3 from the seatpost 1 can be prevented.

FIG. 1*d* shows a sectional view along line C-C in FIG. 1*a*. In this case the section is from the exterior inwardly through the telescopic tube 16, the coupling part 8, and the toothed rack 12. In that respect, it can be seen that the profiled notching in the adjustment part 7 which is in the form of the toothed rack 12 (see also FIG. 1*b*) is in the form of peripherally limited radial projections 21 (in essence, teeth on the toothed rack 12) (see also FIG. 1*f*). The radial projections 21 are in positively locking engagement with profiled notchings suitably provided in the coupling part 8 and in the form of radial grooves 22 (similarly to an interrupted female thread) for positively lockingly connecting the telescopic unit 3 to the support unit 2. In this embodiment, the coupling device 4 is formed by the radial projections 21 in the adjustment part 7 in the form of the toothed rack 12, and the corresponding profiled notchings in the form of radial grooves 21 in the coupling part 8.

The telescopic unit 3 can be coupled to the support unit 2 at a plurality of different coupling positions by the plurality of the radial projections 21 and the profiled notchings in the form of radial grooves 22.

An axial force can be transmitted between the telescopic unit 3 and the support unit 2 in a coupled state by the positively locking connection of the telescopic unit 3 to the support unit 2 by way of the radial projections 21 and the corresponding profiled notchings in the form of radial grooves 22.

In addition FIG. 1*d* shows sliding groove blocks 19 which are formed or arranged on the coupling part 8 and which are mounted in grooves 20 in the telescopic tube 16. Rotation of the coupling part 8 with respect to the telescopic tube 16 can be prevented by the sliding blocks 19 and the grooves 20.

FIG. 1*e* shows a sectional view along line L-L in FIG. 1*b*. In this case the section is from the exterior inwardly through the frame 18, the telescopic tube 16, the cylinder 14 and the piston rod 15. It can be seen in this case that sliding blocks 28 are formed on the cylinder 14 (or are arranged thereon otherwise than as illustrated), the blocks 28 engaging into the grooves 20 in the telescopic tube 16. That can provide for linear guidance of the telescopic unit 3 relative to the support unit 2, and so rotation of the telescopic unit 3 relative to the support unit 2 can be prevented. As the cylinder 14 of the support unit 2 of the seatpost 1 is connected to the frame 18 by the fixing device 13 (see in that respect also FIG. 1*b*), rotation of the telescopic unit 3 and thus a saddle mounted by the seatpost 1 relative to the frame 18 can be prevented.

Figure 1F:
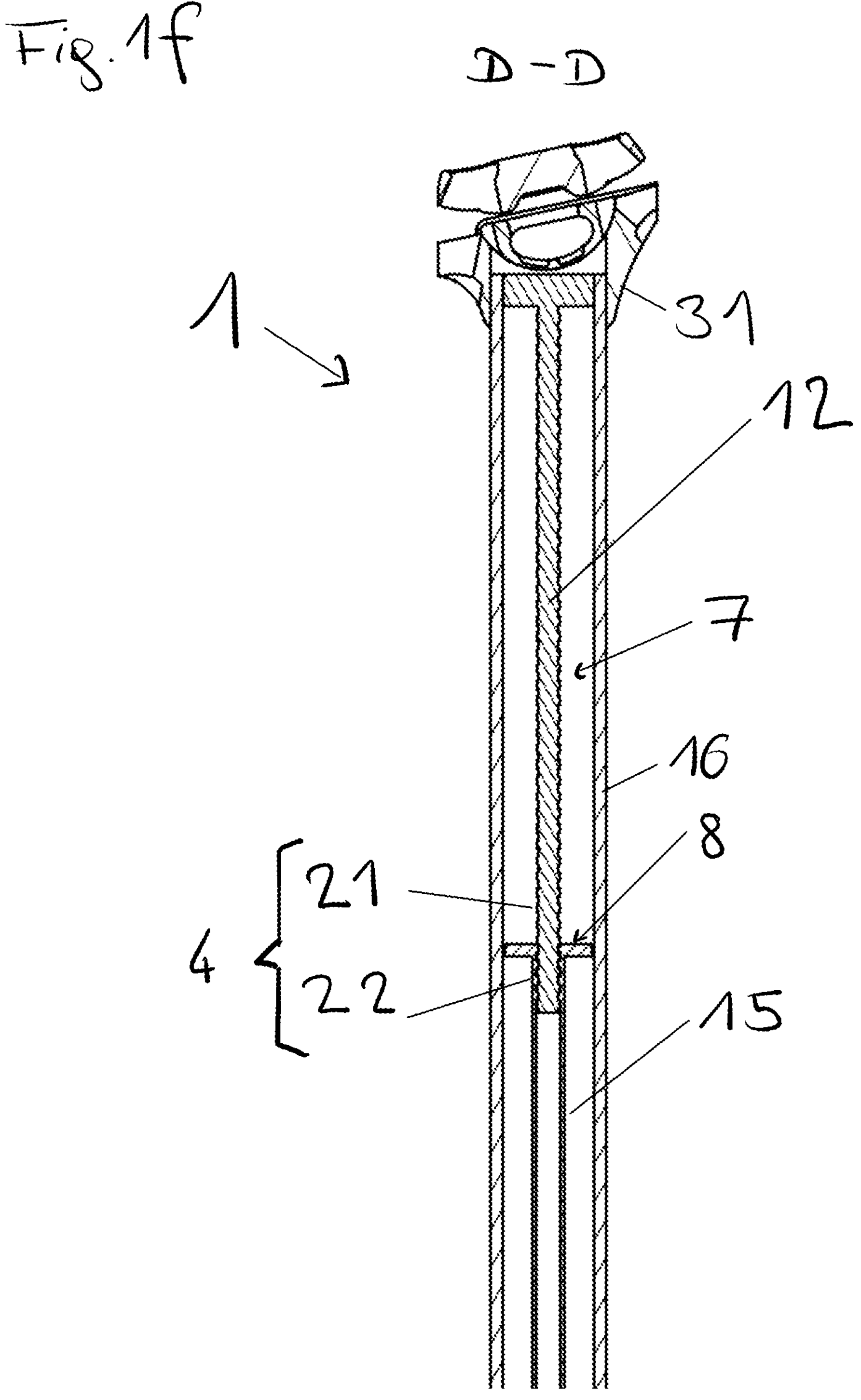

FIG. 1*f* shows a detail view of FIG. 1*b*. In this case, the radial projections 21 of the adjustment part 7 in the form of the toothed rack 12 as well as the profiled notchings in the form of radial grooves 22 in the coupling part 8 can be seen.

In FIGS. 2*a* through 2*e*, the seatpost 1 shown in FIGS 1*a* through 1*f* is in an uncoupled state (see in that respect specifically FIG. 2*d*), with a longitudinal extent (length) of the seatpost reduced in relation to FIG. 1 (characterised by the reduced protrusions ×2 of the telescopic unit 3 out of the frame 18). In comparison with FIG. 1, the telescopic unit 3 has been uncoupled from the support unit 2 by rotation of the lever 10 (see in that respect also FIG. 2*c*). To reduce the longitudinal extent—without a relative movement of the piston of the piston rod 15 with respect to the cylinder 14 of the support unit 2, that is to say without a telescopic movement as described hereinbefore of the telescopic unit 3—the telescopic unit 3 was displaced relative to the support unit 2. That can also be seen by virtue of the fact that the adjustment part 7 in the form of the toothed rack 12 projects further into the piston rod 15 in comparing FIG. 2*b* (section along line K-K in FIG. 2*d*) to FIG. 1*b*.

Figures 2A, 2B:
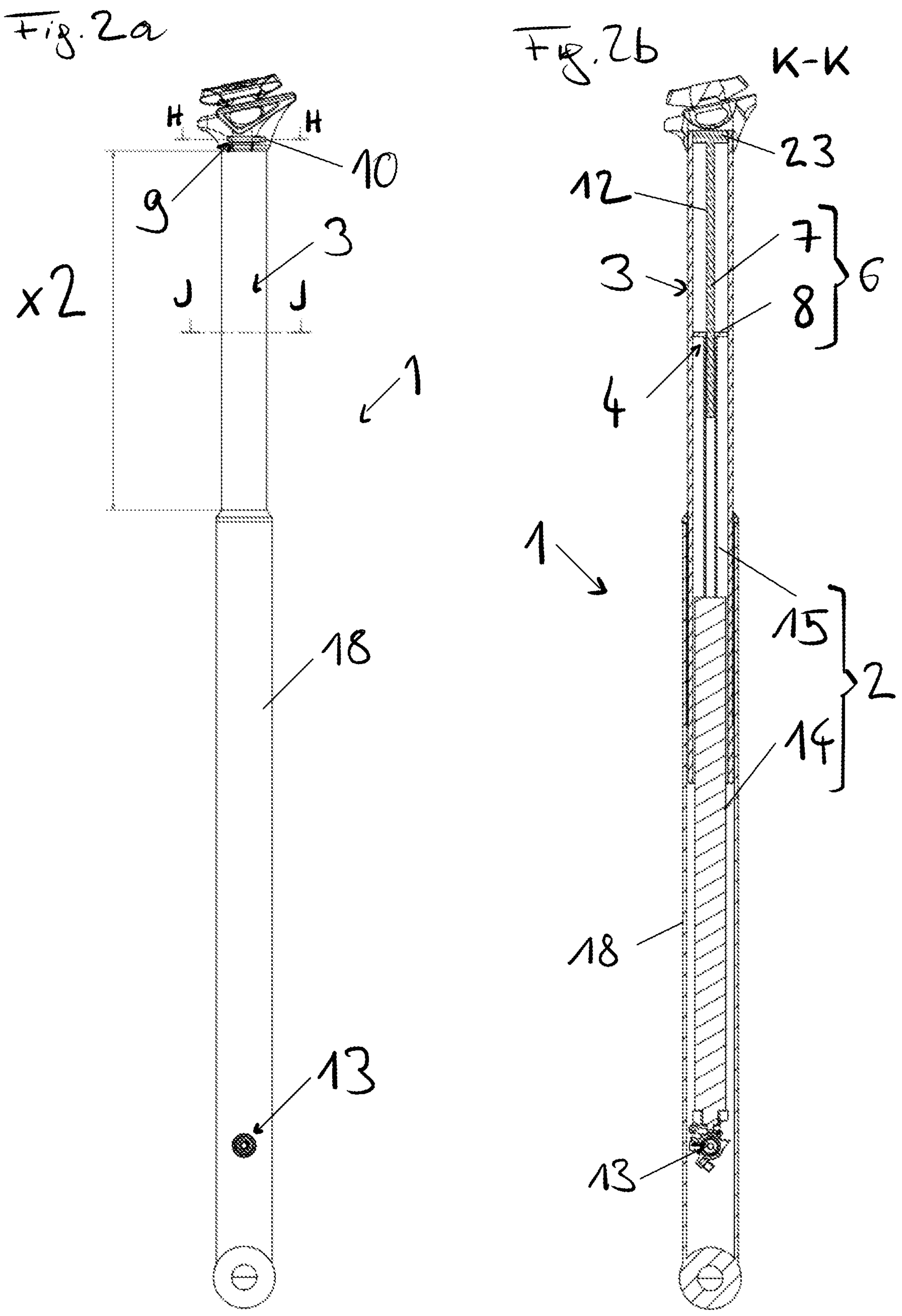
FIGS. 2*a* through 2*e* are side and sectional views of a first embodiment of the seatpost, wherein the seatpost is in an uncoupled state with a longitudinal extent of the seatpost, that is reduced in relation to FIG. 1, FIGS. 3*a* through 3*e* are side and sectional views of a first embodiment of the seatpost, wherein the seatpost is in a coupled state with a longitudinal extent of the seatpost, that is reduced in relation to FIG. 1, FIGS. 4*a* through 4*g* are side and sectional views of a second embodiment of the seatpost, wherein the seatpost is in a coupled state with substantially maximum longitudinal extent of the seatpost.
Figure 2C:
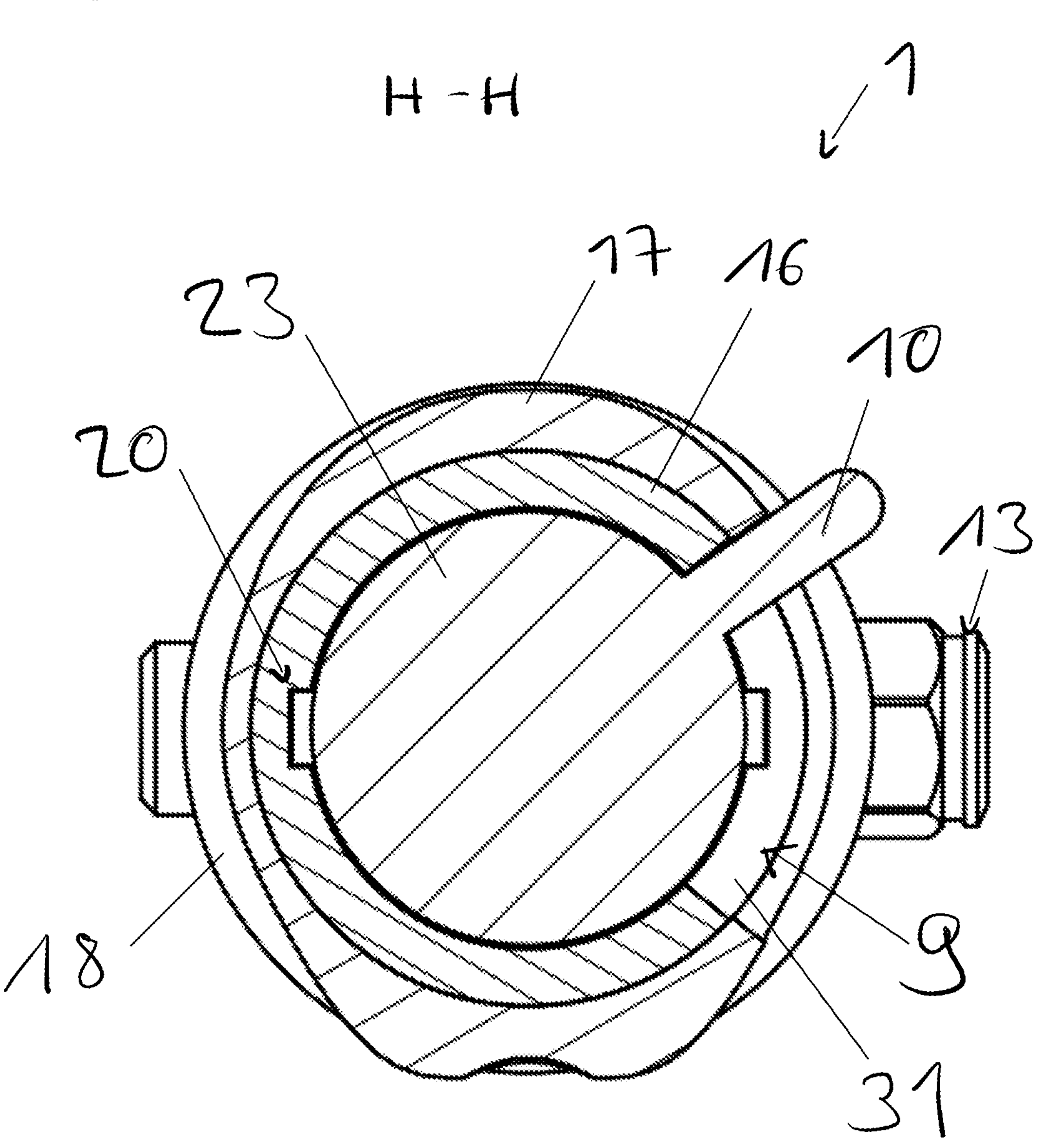

FIG. 2*c* shows a section along line H-H shown in FIG. 2*a*. In comparison with Figure is it can be seen that the lever 10 and thus the head 23 of the toothed rack 12 have been rotated.

Figure 2D:
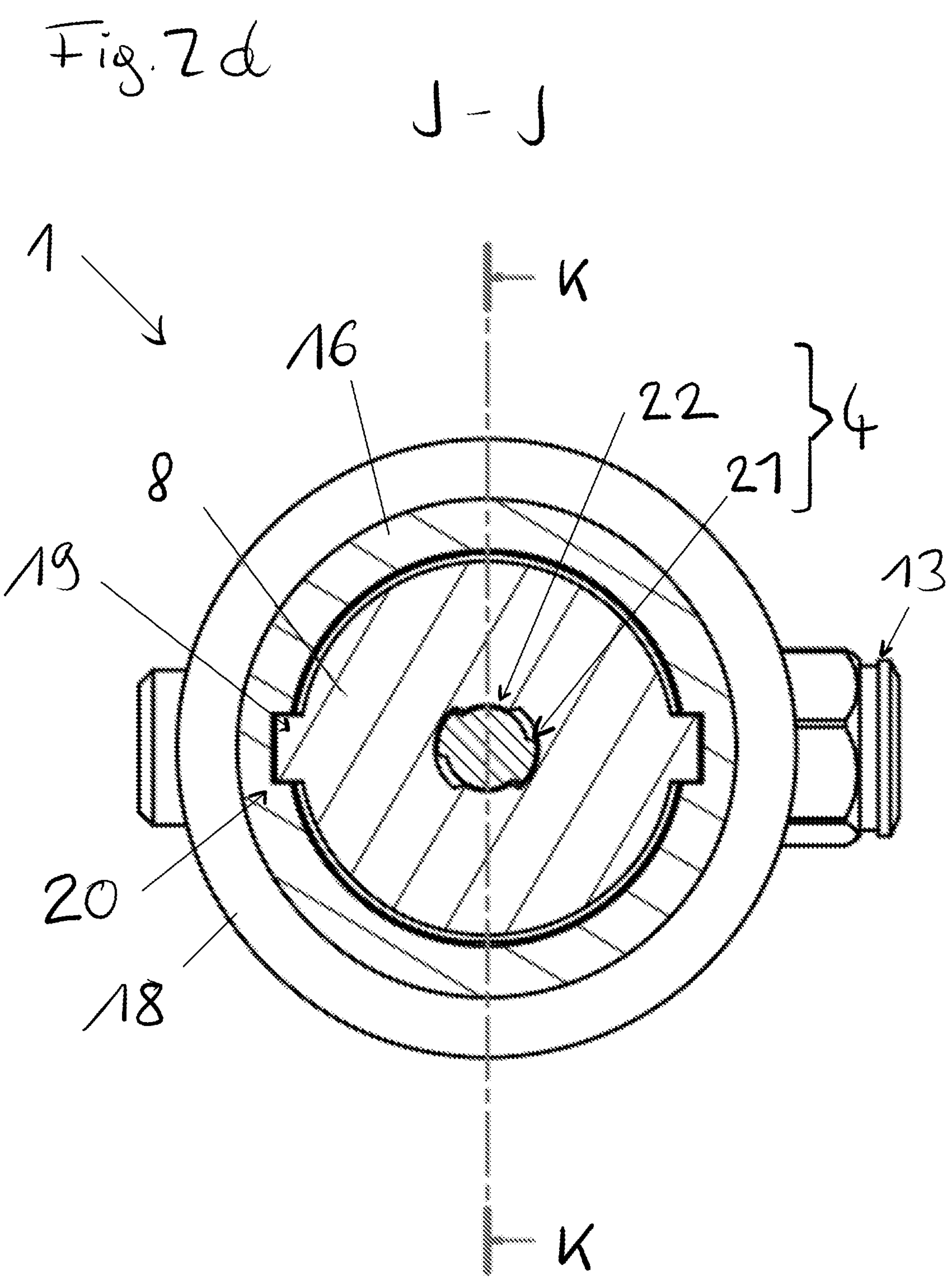

FIG. 2*d* shows a section along line J-J shown in FIG. 2*a*. It can be seen here that due to rotation of the toothed rack 12 the radial projections 21 of the adjustment part 7 in the form of the toothed rack 12 and the profiled notchings in the form of radial grooves 22 in the coupling part 8 have been brought out of engagement whereby the telescopic unit 3 and the support unit 2 have been uncoupled from each other.

Figure 2E:
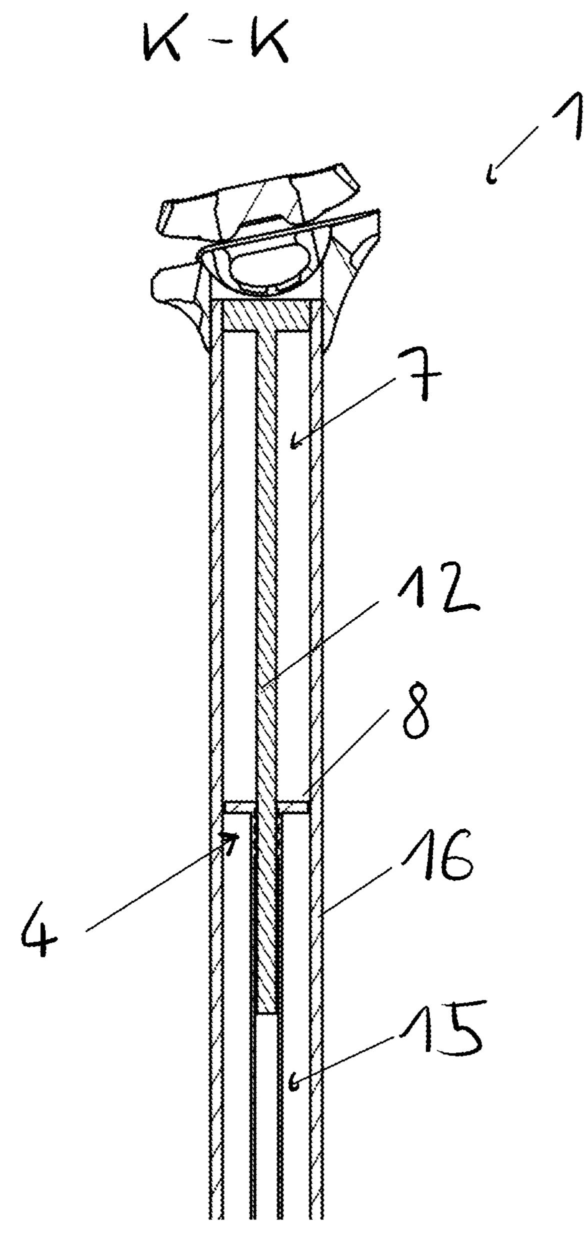

FIG. 2*e* shows a detail view of FIG. 2*b*. Rotation of the toothed rack 12 means that the peripherally limited radial projections 21 have been moved outside the sectional plane (line K-K in FIG. 2*d*) and are therefore not visible in FIG. 2*e*.

In FIGS. 3*a* through 3*e* the seatpost 1 shown in FIGS. 1 and 2 is in a coupled state (see in that respect specifically FIG. 3*d*) with a maximum longitudinal extent (length) of the seatpost reduced in relation to FIG. 1 and also FIG. 2 (characterised by the further reduced protrusion ×3 of the telescopic unit 3 out of the frame 18). In comparison with FIG. 2, the telescopic unit 3 has been coupled to the support unit 2 again by rotation of the lever 10 (see in that respect also FIG. 3*c*). To further reduce the longitudinal extent—again without a relative movement of the piston of the piston rod 15 with respect to the cylinder 14 of the support unit 2, that is to say without a telescopic movement as described above of the telescopic unit 3—the telescopic unit 3 was further displaced relative to the support unit 2 prior to coupling. That can also be achieved in that the adjustment part 7 in the form of the toothed rack 12 projects still a distance further into the piston rod 15 in comparison with FIG. 3*b* (section along line N-N in FIG. 3*d*) relative to FIG. 2. In other words, as explained above, the movable elongated adjustment part 7 of the adjustment mechanism 6 (which has a first end connected to an upper end of the telescopic unit 3 which supports the saddle) is configured to be adjustably locked to the stationary coupling part 8 of the coupling device 4 at various (i.e., any of a plurality of) positions along the longitudinal axis of the adjustment part 7 to adjust the distance between the upper (first) end of the telescopic unit 3 and the support unit 2 fixedly connected to the coupling part 8. As the adjustment part 7 projects further into the piston rod 15 due to the adjustable locking via the coupling part 8 (see, e.g., comparison of FIGS. 1*f* and 3*e*), the telescopic unit 3 is further displaced relative to the support unit 2. As a result, the maximum longitudinal extent of the seatpost 1 can be adjusted.

Figure 3A:
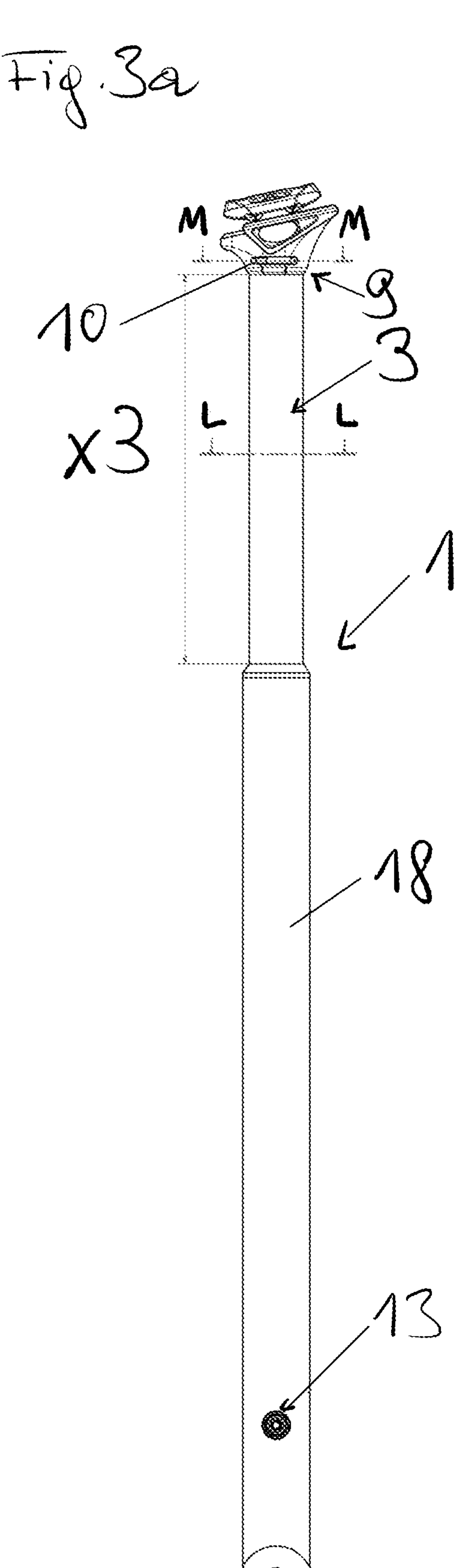
Figure 3B:
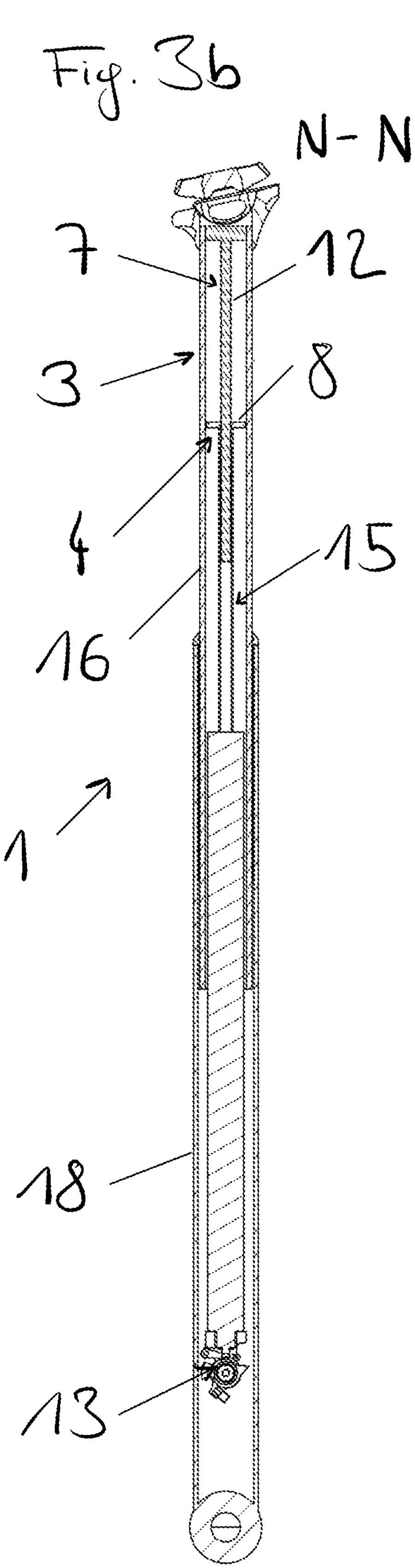
Figure 3C:
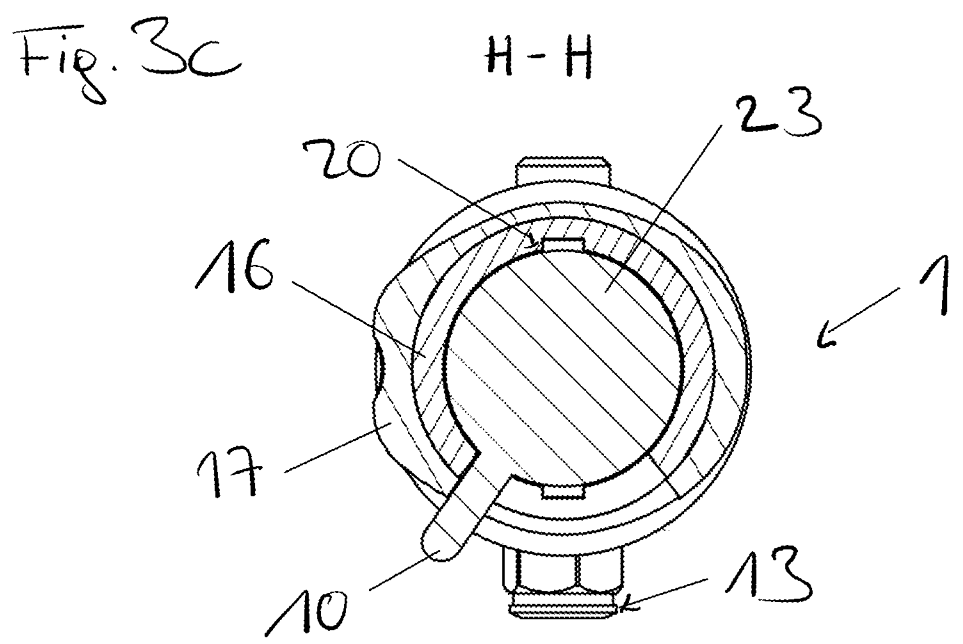
Figure 3D:
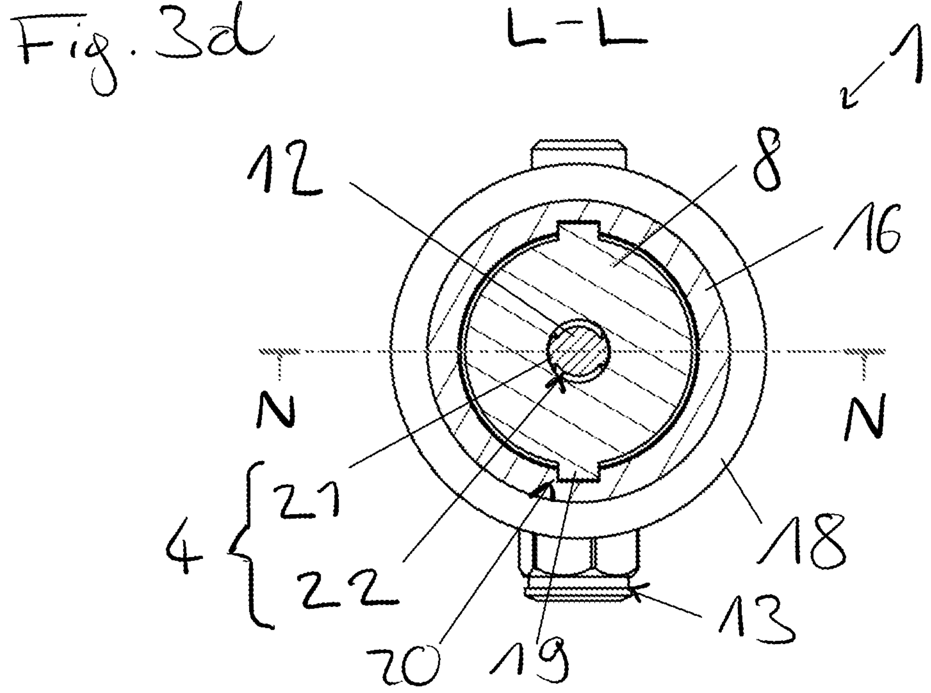

The sectional views in FIGS. 3*c* (section along line H-H in FIG. 3*a*), 3*d* (section along line L-L in FIGS. 3*a*) and 3*e* (detail view of FIG. 3*b*) substantially correspond to the views in FIGS. 1*c*, 1*d* and 1*b* in which the seatpost 1 is also in a coupled state.

Figures 4A, 4B:
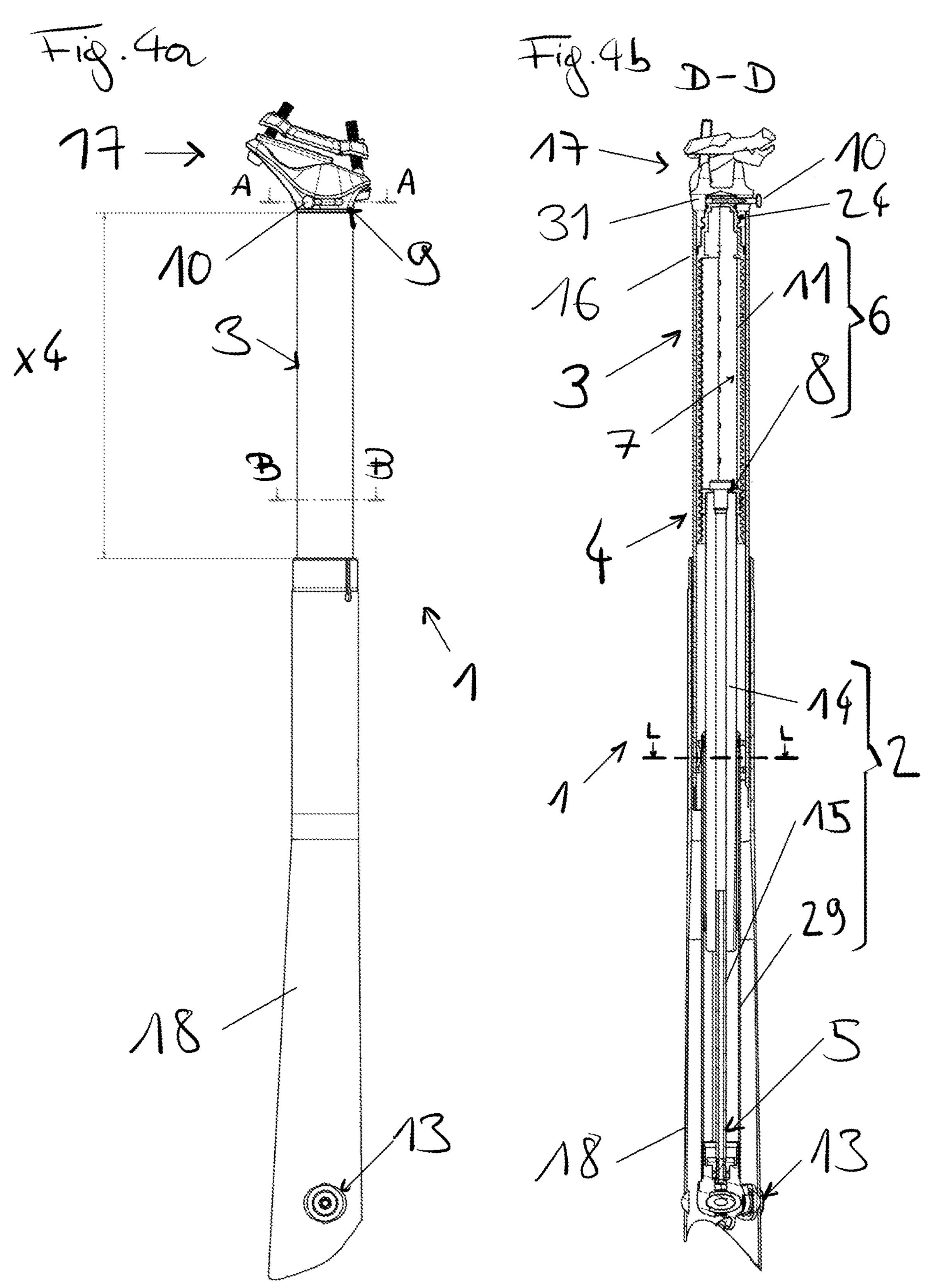

FIGS. 4*a* through 4 show side and sectional views of a second embodiment of the seatpost 1, wherein the seatpost 1 is in a coupled state with substantially maximum longitudinal extent ×4.

FIG. 4*a* shows a seatpost 1 in a second embodiment, arranged in the saddle tube of a frame 18. The telescopic unit 3 which partially projects out of the frame 18 with a saddle clamp 17 for mounting a bicycle saddle is visible from the exterior. The seatpost 1 is connected to the frame 18 by way of the fixing device 13. In the illustrated embodiment the saddle unit 3 has a radial opening 9, through which the coupling device 4 (see also FIG. 4*b*) can be actuated from outside the telescopic unit 3 by way of a lever 10 projecting out of the radial opening 9.

In this embodiment of the seatpost 1 the blocking device 5 is in the form of part of the support unit 2.

Figure 4D:
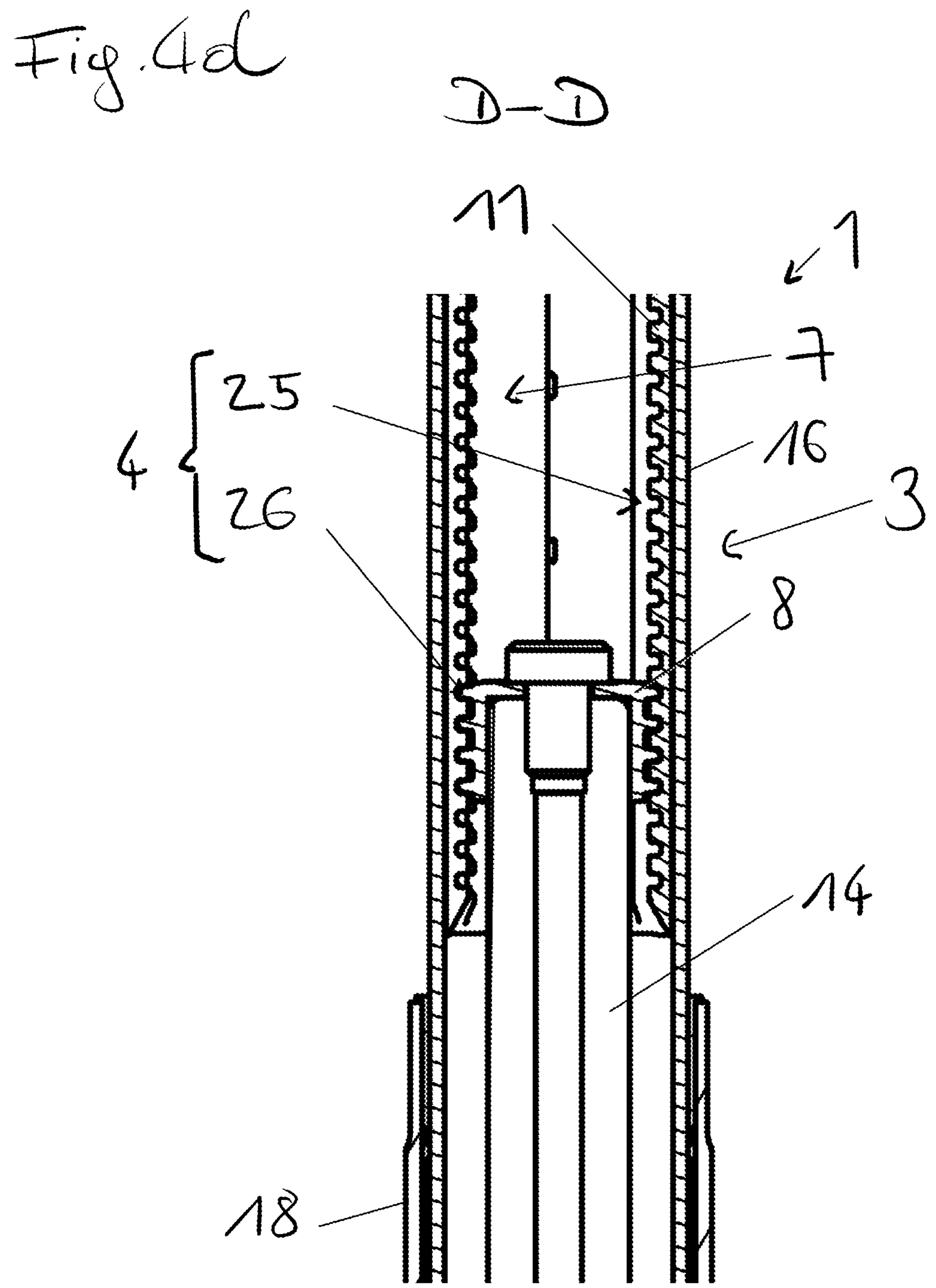
Figure 4E:
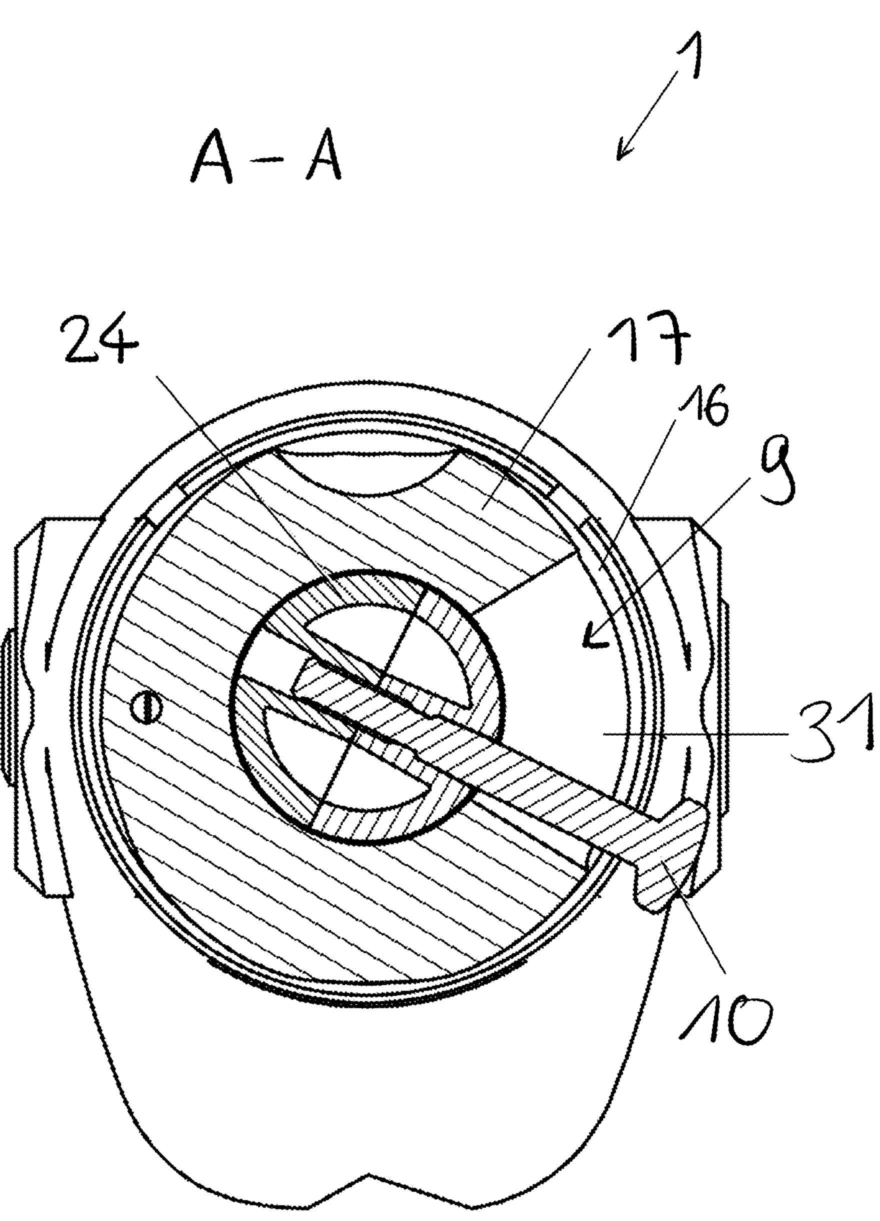
Figure 4F:
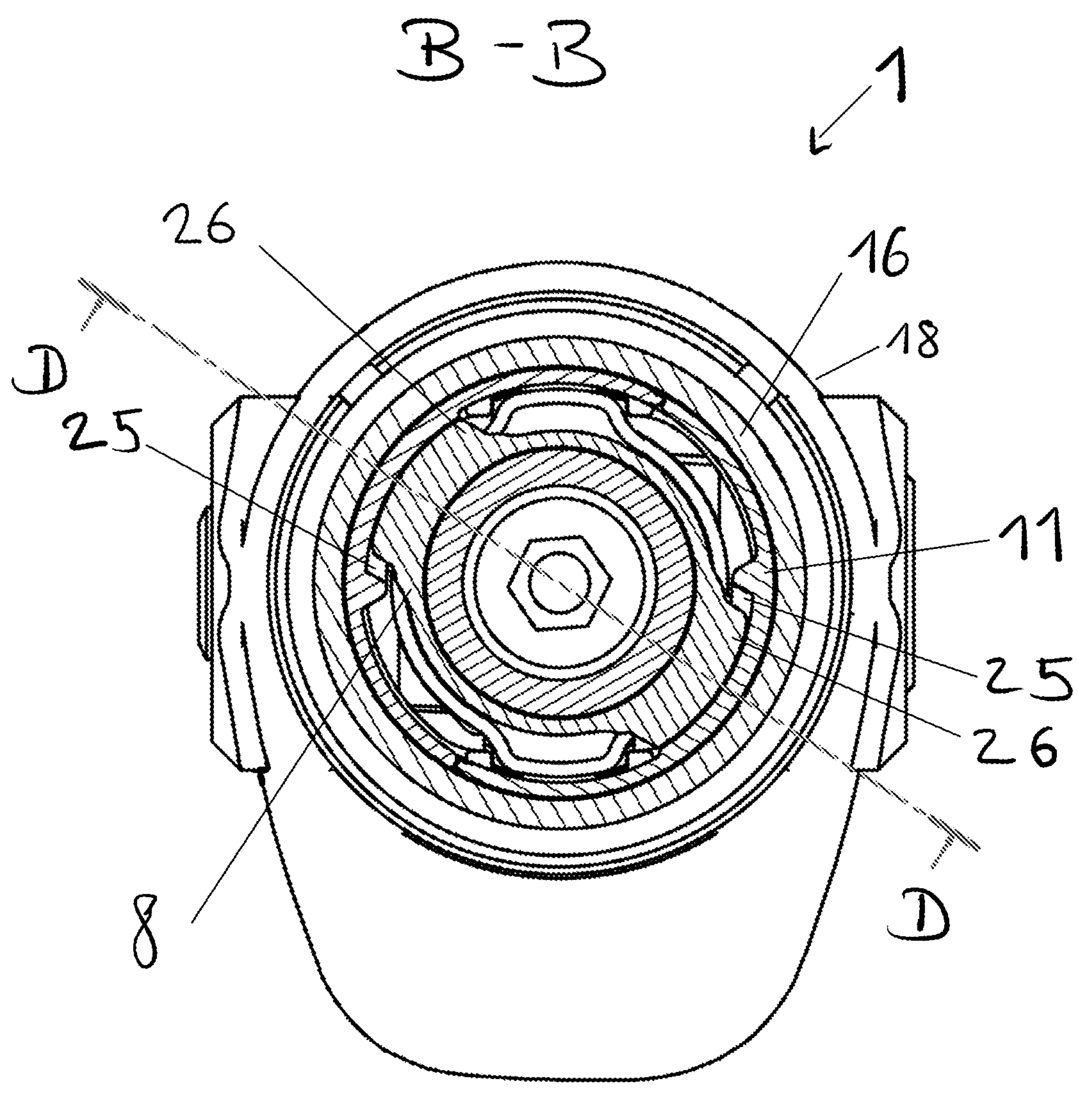
Figure 4G:
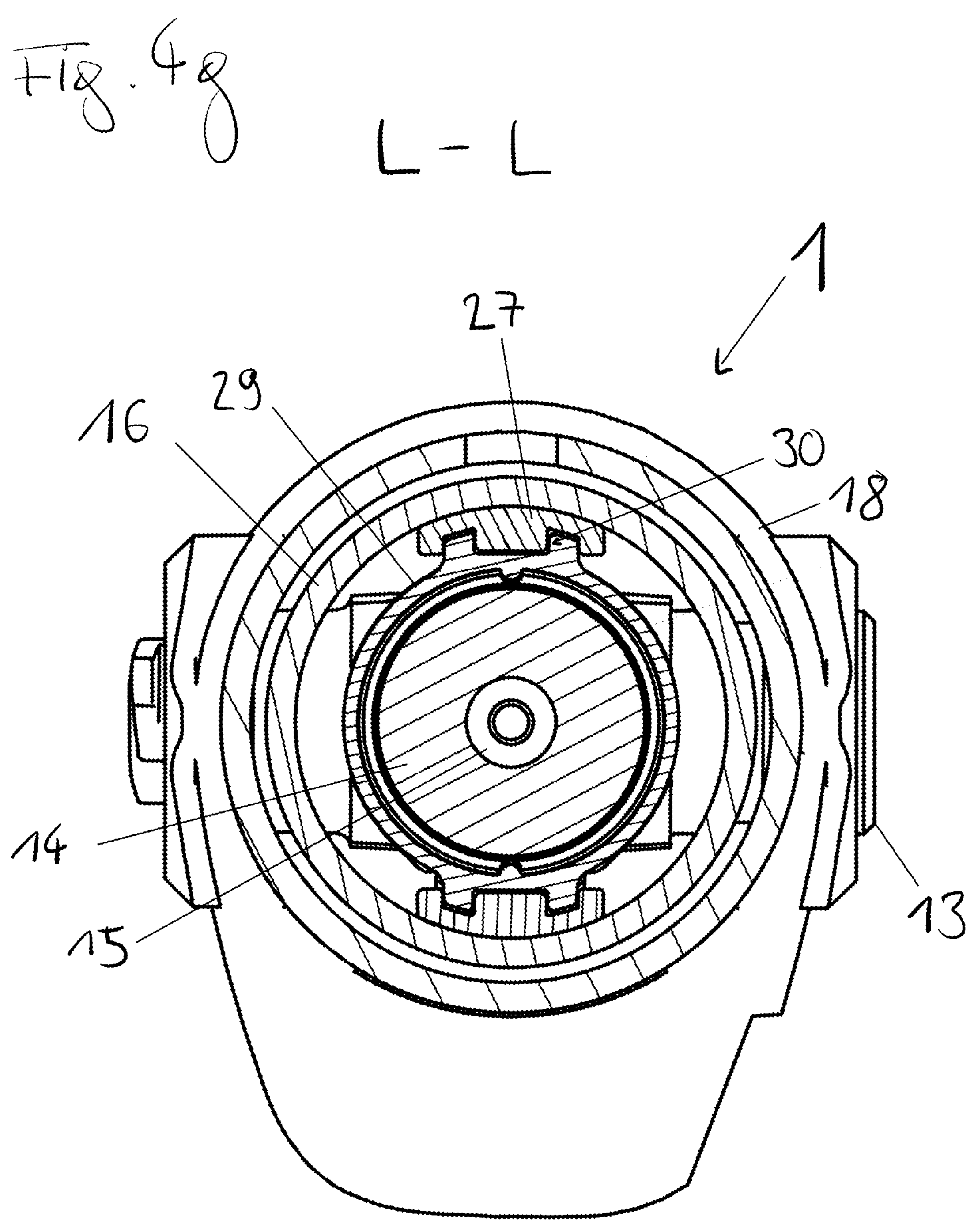

The sectional planes A-A, B-B and L-L shown in FIGS. 4*a* and 4*b* are shown in FIGS. 4*e*, 4*f* and 4*g* respectively.

FIG. 4*b* is a sectional view along a longitudinal axis of the seatpost 1 in FIG. 1*a* (line D-D in FIG. 4*f*). A support unit 2 in a configuration of a piston with piston rod 15, mounted in a cylinder 14, can be seen in the sectional view. In this embodiment the support unit has a support tube 29 for guiding the telescopic unit 3 (see in that respect also FIG. 4*g*). A comparison with the first embodiment of the seatpost 1, shown in FIGS. 1 through 3, shows that the arrangement of the support unit 2 is substantially inverted in the second embodiment. The support unit 2 can however be arranged independently of the configuration of the coupling device 4.

Arranged between the telescopic unit 3 and the support unit 2 is a coupling device 4 (for further details see FIGS. 4*d* and 4*f*), by means of which the telescopic unit 3 is coupled to the support unit 2. In the illustrated embodiment the coupling device 4 has an adjustment mechanism 6 with an adjustment part 7 associated with the telescopic unit 3 and in the form of a sleeve 11, and a coupling part 8 associated with the support unit 2. The adjustment part 7 in the form of the sleeve 11 is mounted coaxially and rotatably in an inner region of the telescopic unit 3 which is tubular in the form of the telescopic tube 16. In this embodiment mounting of the adjustment part 7 in the head 31 of the telescopic unit 3 is implemented by way of the head 24 of the sleeve 11 and is advantageously suited to the transmission of axially acting forces.

The seatpost 1 is in a coupled state (see in that respect FIG. 4*f*) with the substantially maximum longitudinal extent of the seatpost 1 (characterised by the protrusion ×4 of the telescopic unit 3 out of the frame 18).

A comparison with FIG. 4*a* shows that in this embodiment the adjustment part 7 in the form of the sleeve 11 of the adjustment mechanism 6 is rotatable relative to the telescopic unit 3 through the radial opening 9 in the latter. The coupling part 8 in this case is advantageously mounted non-rotatably to the support unit 2 and is also secured against rotation with respect to the telescopic unit 3.

FIGS. 4*c* and 4*d* show detail views of the upper and lower ends of the seatpost 1 shown in FIG. 4*b*. FIG. 4*c* shows the opening 9 provided radially in the head 31 of the telescopic unit 3 and the lever 10 connected to the head 24 of the sleeve 11. At the inside the tubular sleeve 11 has profiled notchings in the form of radial grooves 25, by means of which a positively locking connection can be made between the telescopic unit 3 and the support unit 2, together with radial projections 26 which are shown in FIG. 4*d* and provided on the coupling part 8. In this embodiment the coupling device 4 is formed by the radial grooves 25 in the adjustment part 7 in the form of the sleeve 11 and the corresponding radial projections 26 in the coupling part 8.

The telescopic unit 3 can be coupled to the support unit 2 at a plurality of different coupling positions by the plurality of radial grooves 25 and the corresponding radial projections 26.

FIG. 4*e* shows a sectional view along line A-A shown in FIG. 4*a*. In this case the section is from the exterior inwardly through the saddle clamp 17 and the head 24 of the sleeve 11. The Figure shows the opening 9 provided radially in the head of the telescopic unit 3 and the lever 10 connected to the head 24 of the sleeve 11.

FIG. 4*f* shows a sectional view along line B-B in FIG. 4. The sectional plane is just above the coupling part 8. The section here is from the exterior inwardly through the telescopic tube 16, the sleeve 11 and the coupling part 8. It can be seen here that the profiled notchings in the adjustment part 7 in the form of the sleeve 11 are in the form of peripherally limited radial grooves 25 (see also FIG. 4*d*). The radial grooves 25 are in positively locking engagement with peripherally limited radial projections 26 correspondingly provided in the coupling part 8 for positively lockingly connecting the telescopic unit 3 to the support unit 2.

The positively locking connection of the telescopic unit 3 to the support unit 2 by way of the radial grooves 25 and the corresponding radial projections 26 provides that in a coupled state an axial force can be transmitted between the telescopic unit 3 and the support unit 2.

FIG. 4*g* shows a sectional view along line L-L in FIG. 4*b*. The section here is from the exterior inwardly through the frame 11, the telescopic tube 16, the support tube 29, the cylinder 14 and the piston rod 15. It can be seen that sliding blocks 27 are arranged on the telescopic tube 16 (for example screwed, or formed thereon otherwise than as illustrated), that engage into the grooves 30 in the support tube 29. That can provide for linear guidance of the telescopic unit 3 relative to the support unit 2 and prevent rotation of the telescopic unit 3 relative to the support unit 2. Guidance of the cylinder 14 relative to the support tube 29 can be effected in a similar fashion (groove and sliding block in the groove). As the support tube 29 of the support unit 2 of the seatpost 1 is connected to the frame 18 by way of the fixing device 13 (see in that respect also FIG. 4*b*) rotation of the telescopic unit 3 and therewith a saddle mounted by the seatpost 1 relative to the frame 18 can be prevented.

The groove 30 of the support tube 29 can be releasably closed at the upper end of the support tube 29, whereby unintentional complete removal of the telescopic unit 3 out of the seatpost 1 can be prevented.

In FIGS. 5*a* through 5*f* the seatpost 1 shown in FIGS. 4*a* through 4*f* is in an uncoupled state (see in that respect specifically FIGS. 5*d* and 5*f*) with the longitudinal extent of the seatpost 1 being reduced in relation to FIG. 4 (characterised by the reduced protrusion ×5 of the telescopic unit 3 out of the frame 18). In comparison with FIG. 4 the telescopic unit 3 has been uncoupled from the support unit 2 by rotation of the lever 10 (see in that respect also FIG. 5*e*). To reduce the longitudinal extent—without a relative movement of the piston of the piston rod 15 with respect to the cylinder 14 of the support unit 2, that is to say without an above-described telescopic movement of the telescopic unit 3—the telescopic unit 3 was displaced relative to the support unit. That can also be seen from the fact that the lower end of the adjustment part 7 in the form of the sleeve projects further beyond the coupling part 8 in comparison with FIG. 5*b* (section along line G-G in FIG. 5*f*) relative to FIG. 4.

Figures 5A, 5B:
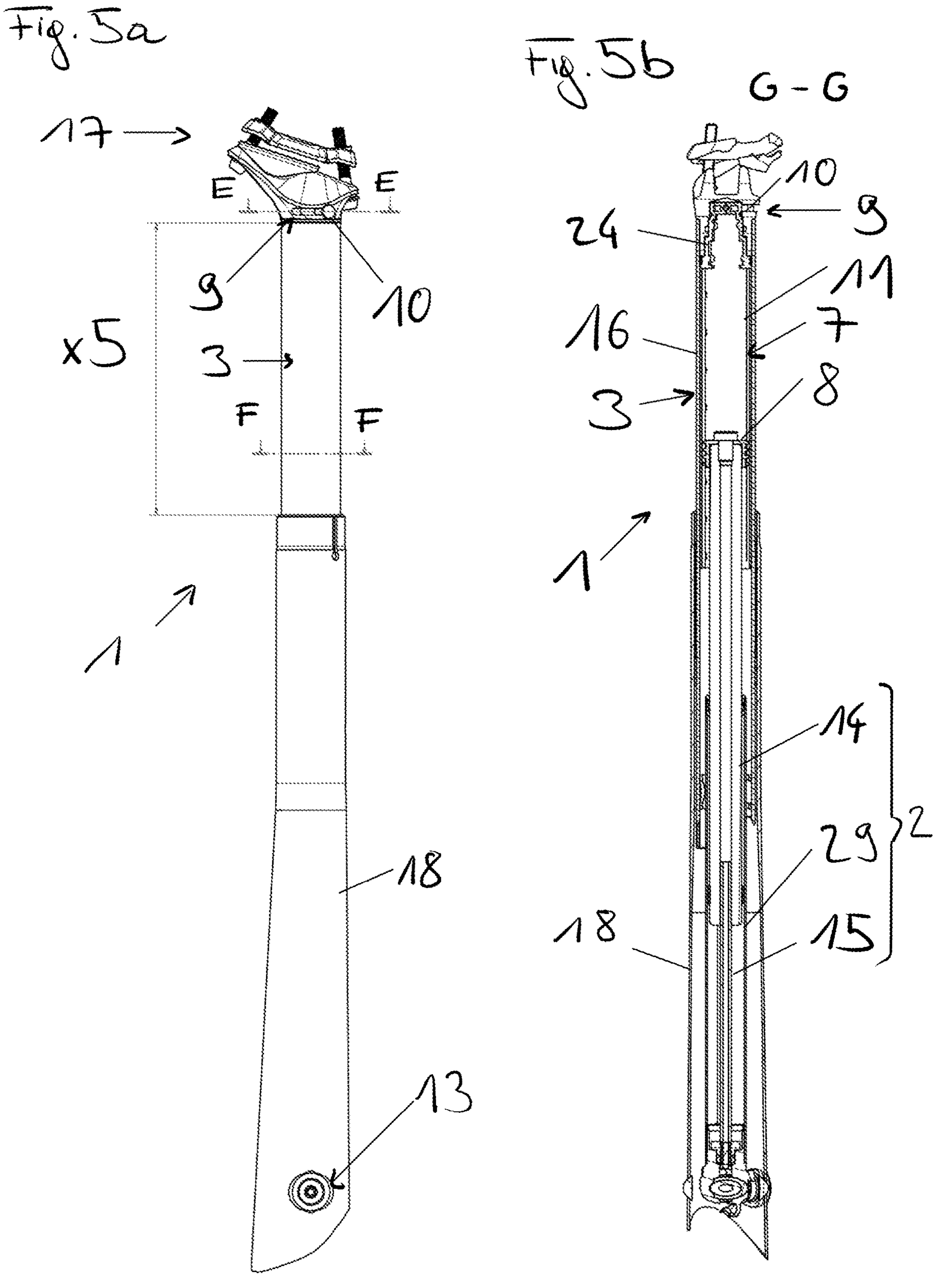
Figure 5C:
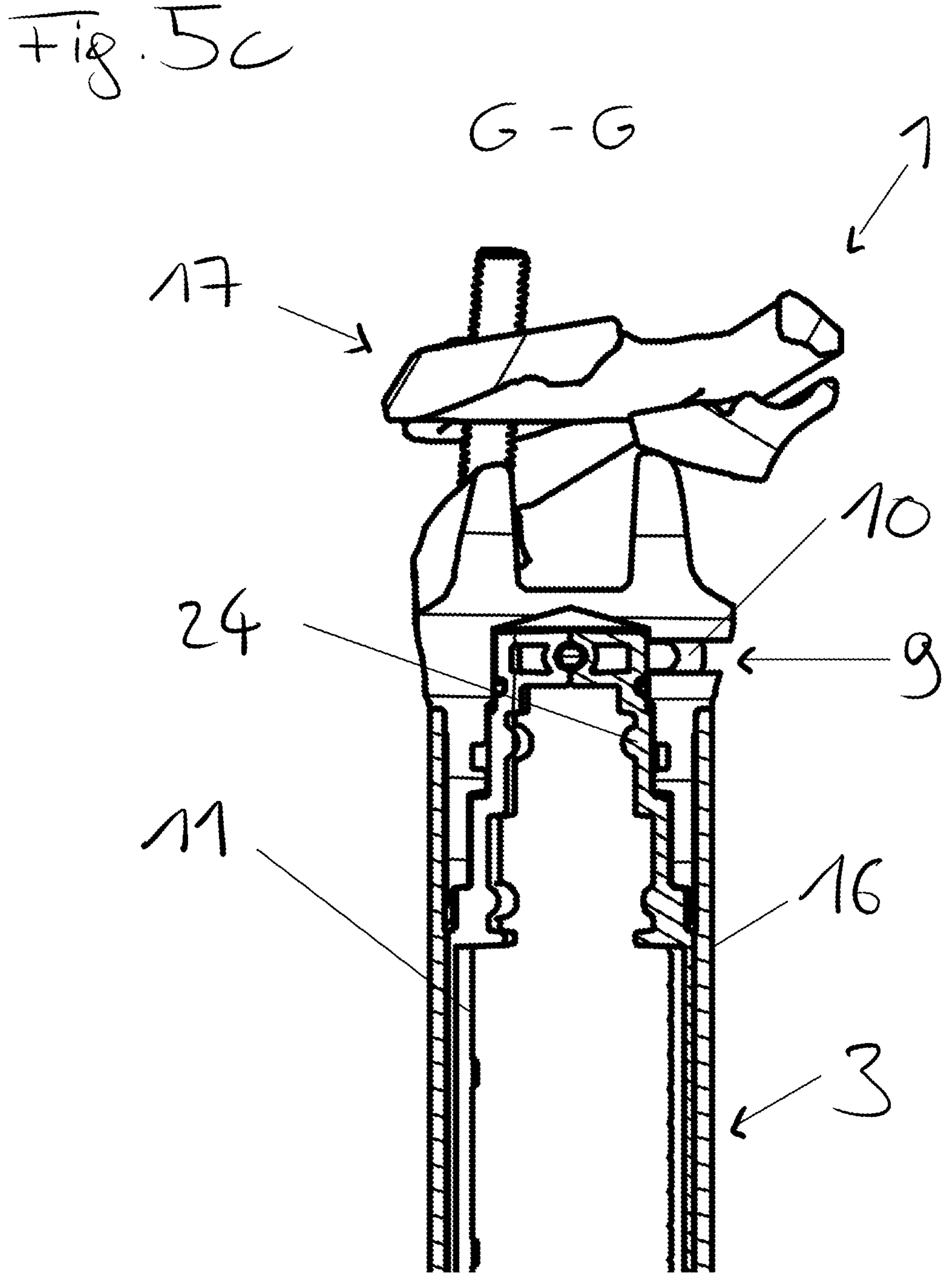

FIGS. 5*c* and 5*d* show detail views of the upper and lower ends of the seatpost 1 shown in FIG. 5*b*. The peripherally limited radial grooves 25 have been moved outside the sectional plane (line G-G in FIG. 5*f*) and are therefore not visible in FIGS. 5*c* and 5*d* by the rotation of the sleeve 11 by way of the lever 10 (see FIG. 4*c*) for uncoupling the telescopic unit 3 and the support unit 2.

Figure 5E:
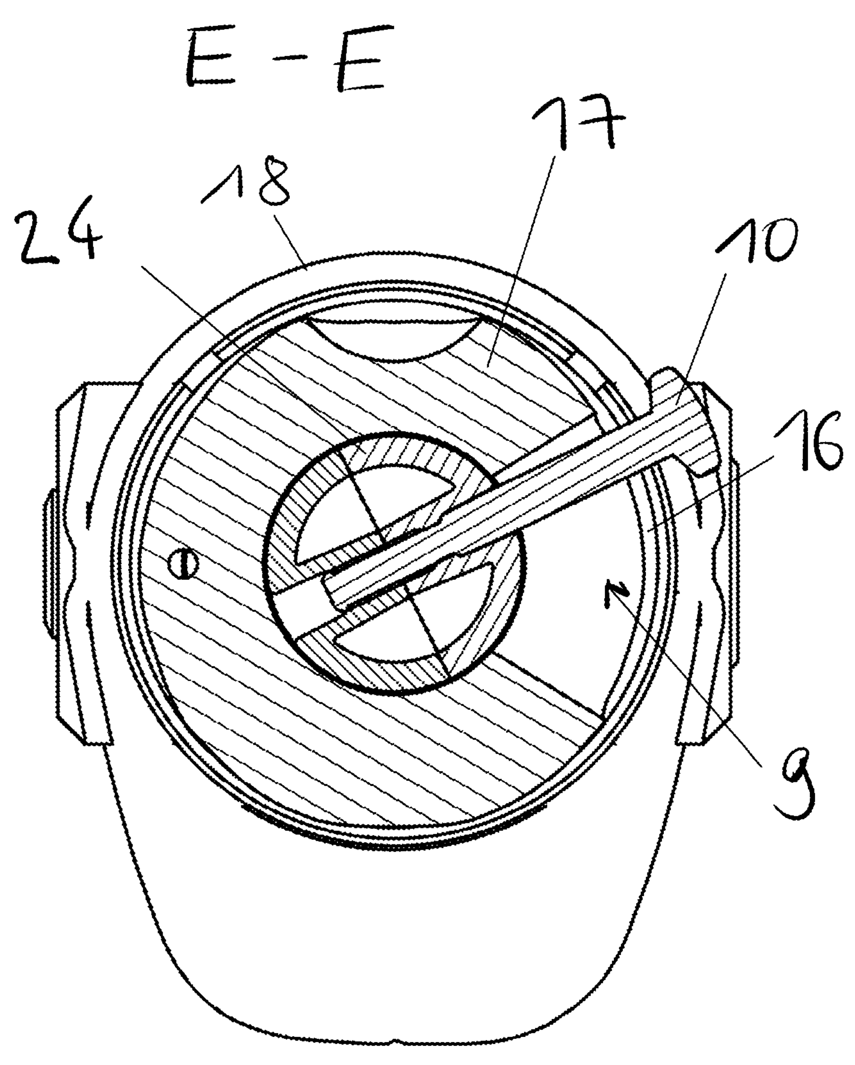

FIG. 5*e* shows a section along line H-H shown in FIG. 5*a*. It can be seen in comparison with FIG. 4*e* that the lever 10 and therewith the head 24 of the sleeve 11 have been rotated.

Figure 5F:
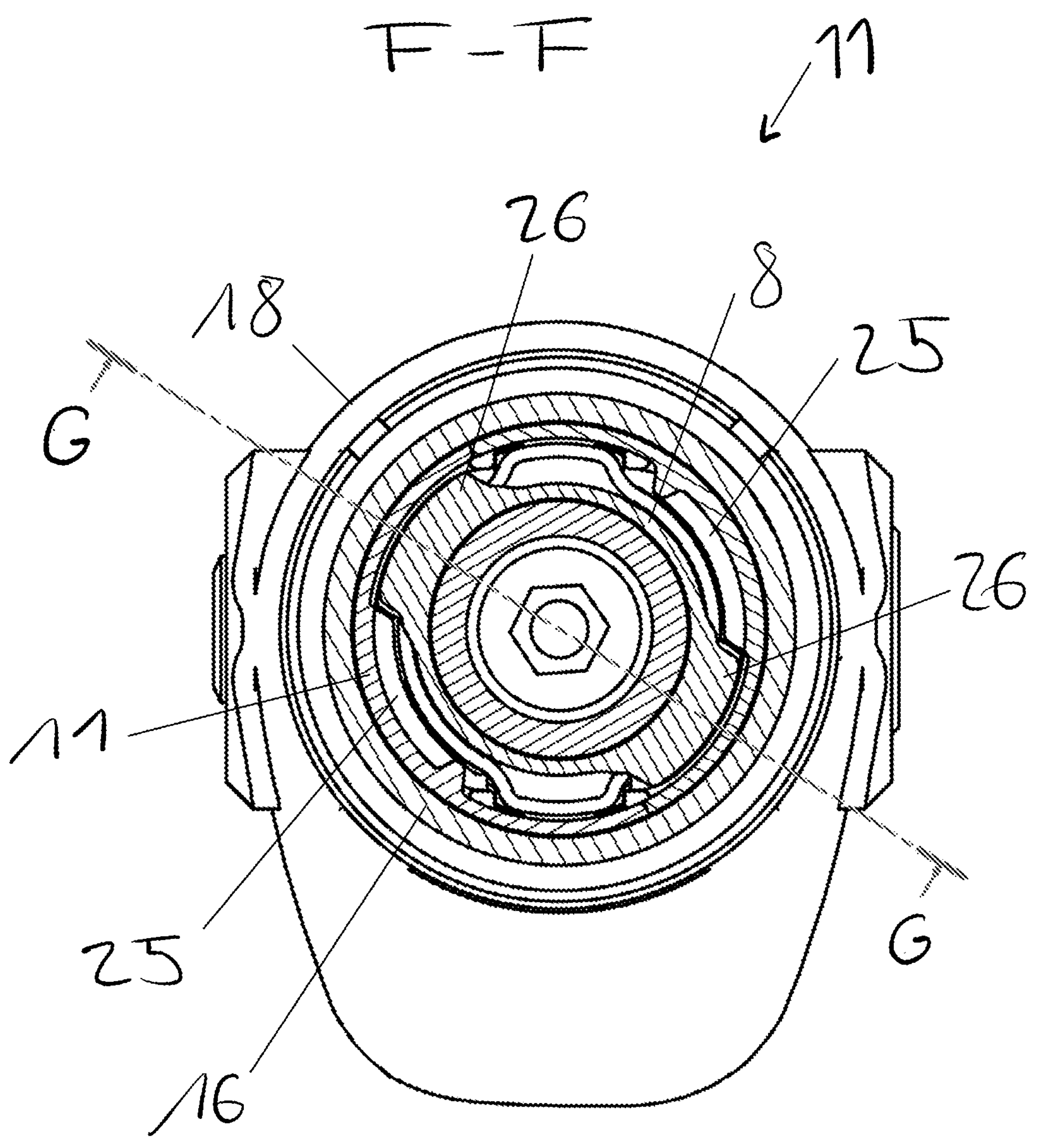

FIG. 5*f*, similarly to FIG. 4*f*, shows a sectional view along line F-F in FIG. 5*a*. The sectional plane is again just above the coupling part 8. The peripherally limited radial grooves 25 of the sleeve 11 have been brought out of engagement with the peripherally limited radial projections 26 in the coupling part 8 by a rotary movement.

Displacement of the telescopic unit 3 relative to the support unit 2 can be made possible by a now uncoupled connection of the telescopic unit 3 to the support unit 2.

Figure 6C:
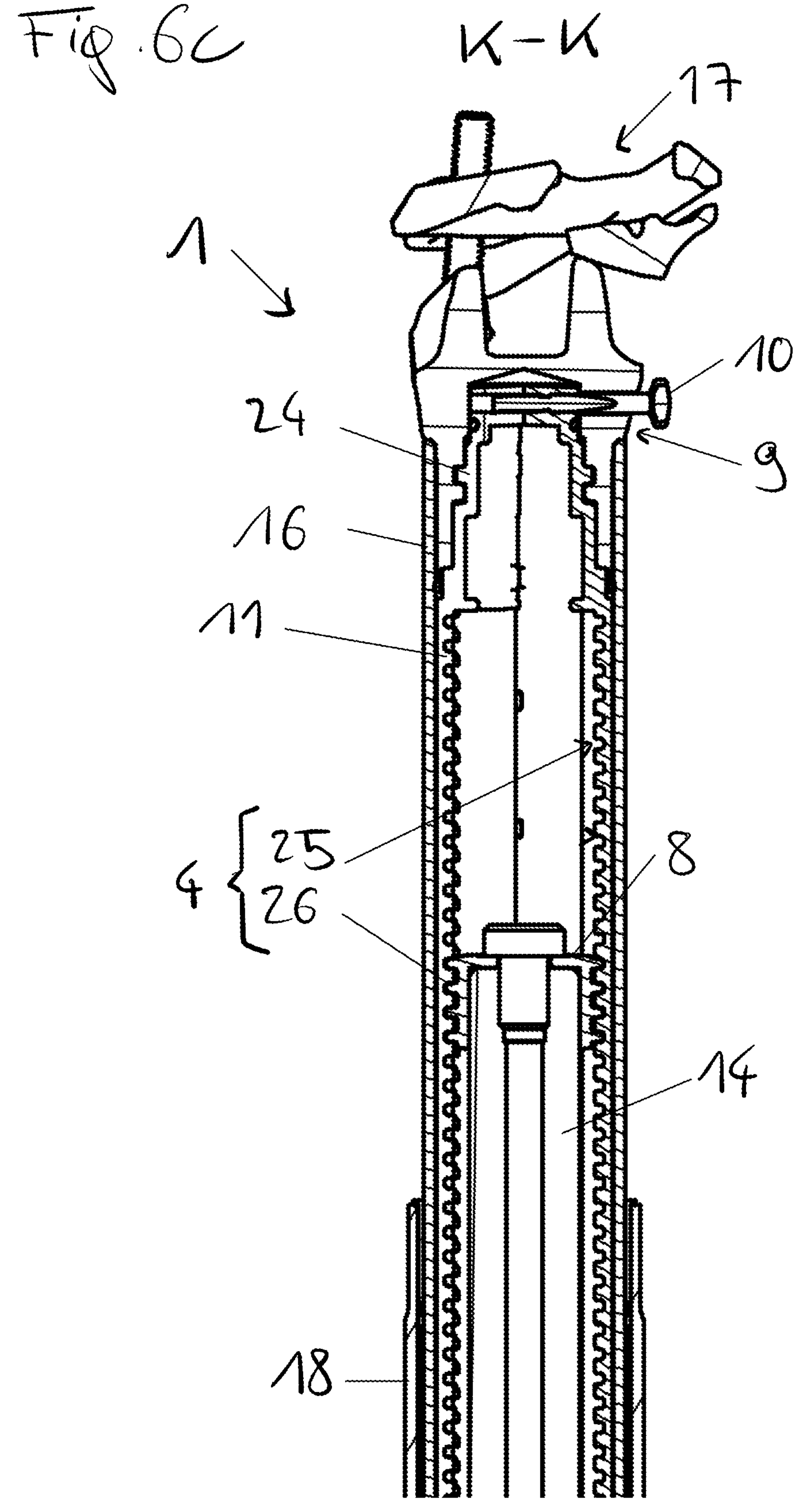
Figure 6D:
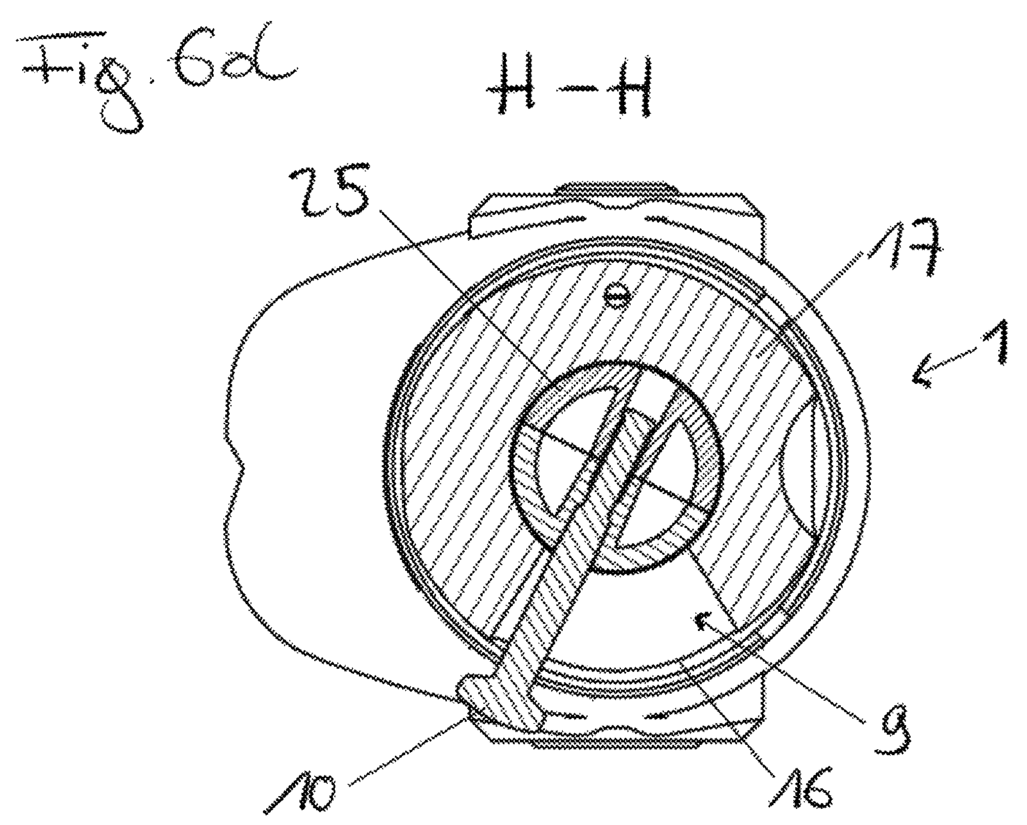

In FIGS. 6*a* through 6*e* the seatpost 1 shown in FIGS. 4 and 5 is in a coupled state (see in that respect specifically FIGS. 6*c* and 6*e*) with a maximum longitudinal extent of the seatpost 1, that is reduced in relation to FIG. 4 and also FIG. 5 (characterised in FIG. 6*a* by the further reduced protrusion ×6 of the telescopic unit 3 out of the frame 18). In comparison with FIG. 5 the telescopic unit 3 has again been coupled to the support unit 2 by rotation of the lever 10 (see in that respect also FIG. 6*d*). To further reduce the longitudinal extent—again without a relative movement of the piston of the piston rod 15 relative to the cylinder 14 of the support unit 2, that is to say without an above-described telescopic movement of the telescopic unit 3—the telescopic unit 3 was further displaced relative to the support unit 2 prior to coupling. That can also be seen from the fact that the lower end of the adjustment part 7 in the form of the sleeve 11 projects still further beyond the coupling part 8 in comparison with FIG. 6*b* (section along line K-K in FIG. 6*e*) relative to FIG. 5.

Figure 6E:
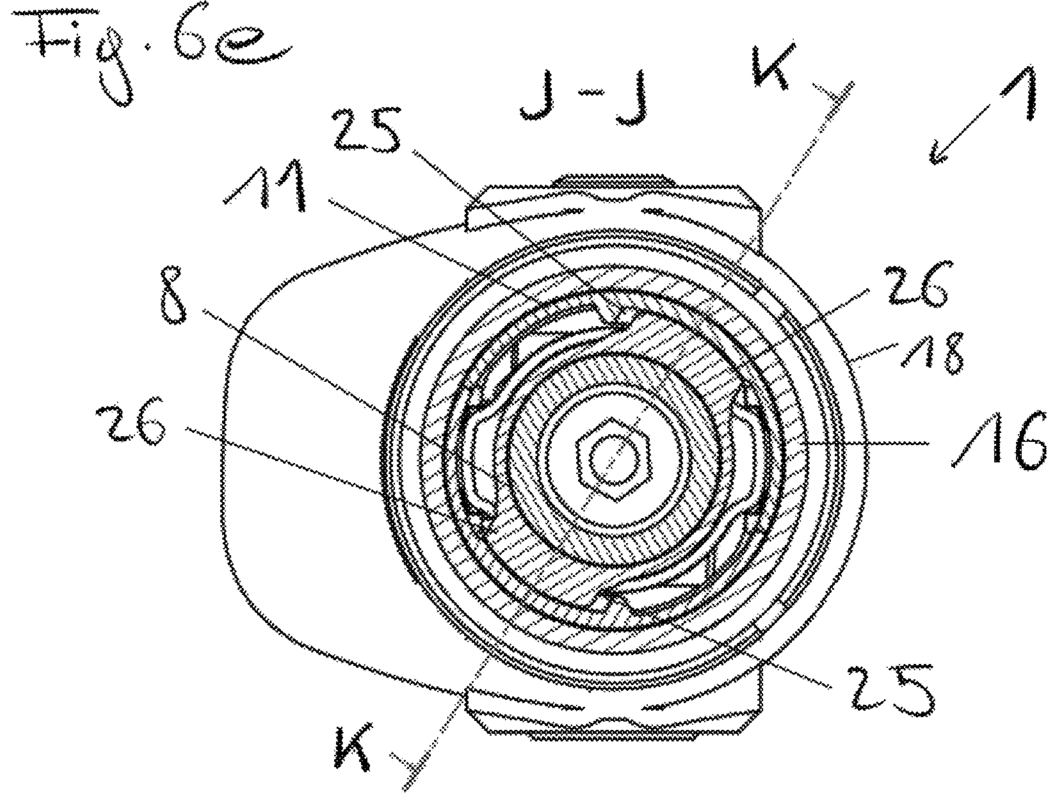

The sectional views in FIGS. 6*c* (detail view of FIG. 6*b*), 6*d* (section along line H-H in FIGS. 6*a*) and 6*e* (section along line J-J in FIG. 6*e*) substantially correspond to those in FIGS. 4*c*, 4*d*, 4*e* and 4*f* in which the seatpost 1 is also in a coupled state.

Otherwise than as illustrated the adjustment mechanism 6 for the first embodiment of the seatpost 1 can be provided with a spindle with a continuous male thread instead of the toothed rack 12 and a corresponding continuous female thread in the coupling part 8 instead of the radial grooves 22. Similarly, for the second embodiment of the seatpost 1, the sleeve 11 can be provided with a continuous female thread and the coupling part 8 can be provided with a continuous male thread instead of the radial grooves 25 and the radial projections 26. In such a case for example actuation of the adjustment mechanism 6 can be respectively effected by way of an adjusting wheel.

The possibility that an adjusting wheel is provided instead of the lever 10 is also not to be excluded.

The fact that the lever 10 (or an adjusting wheel) is actuable through an axial opening in the telescopic unit 3 otherwise than as illustrated is also not to be excluded.

Figures 7A, 7B:
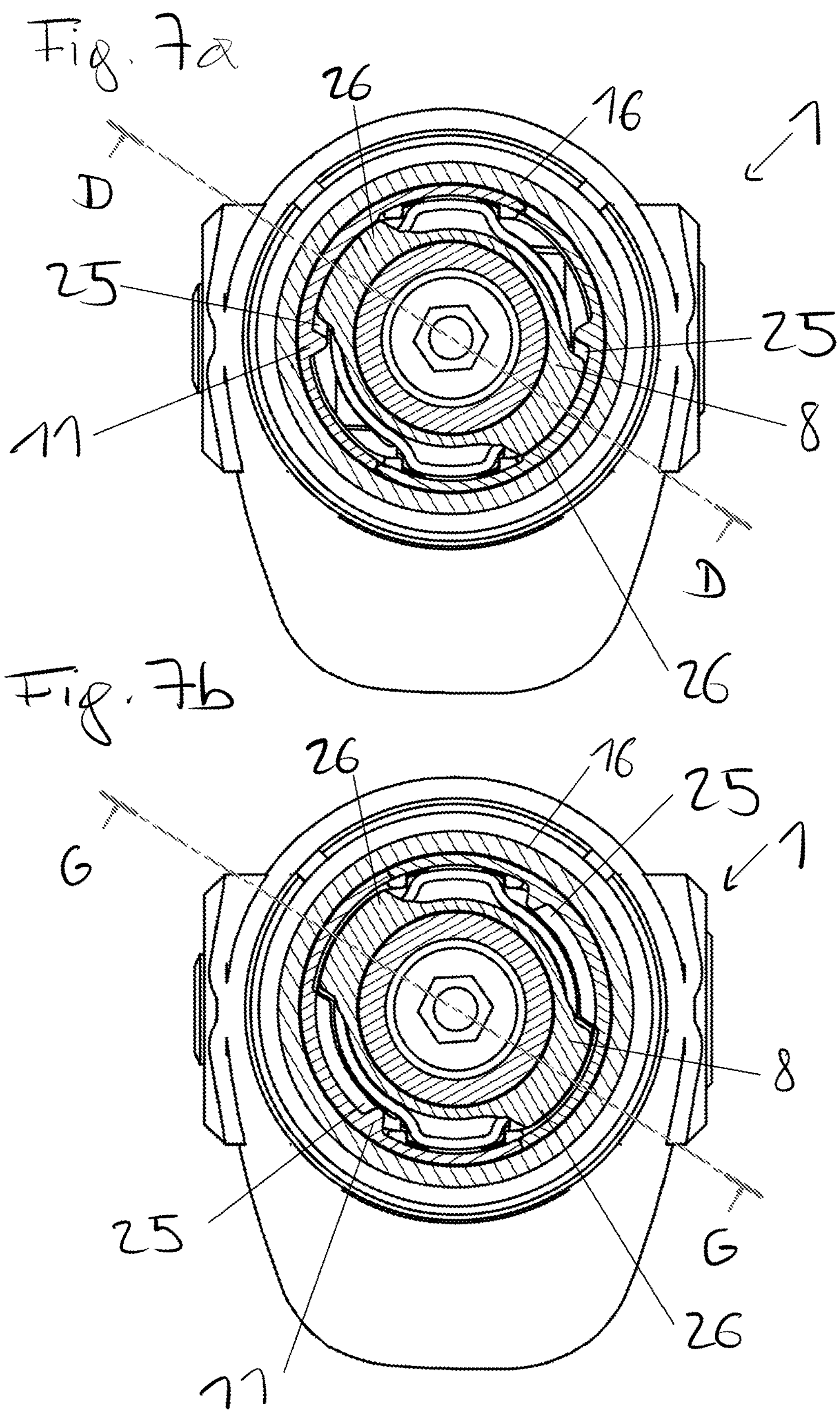

FIGS. 7*a* and 7*b*, to better illustrate the situation, show a comparison of the seatpost 1 in the second configuration in a coupled state (FIG. 7*a*) and in an uncoupled state (FIG. 7*b*). It can be seen in a comparison of FIG. 7*a* with FIG. 7*b* that a positively locking connection of the radial grooves 25 to the radial projections 26 can be released (transition FIGS. 7*a* to 7*b*) or made (transition FIGS. 7*b* to 7*a*) by rotation of the sleeve 11 in the counter-clockwise direction.

LIST OF REFERENCES

1 seatpost
2 support unit
3 telescopic unit
4 coupling device
5 blocking device
6 adjustment mechanism
7 adjustment part
8 coupling part
9 opening
10 lever
11 sleeve
12 toothed rack
13 fixing device
14 cylinder
15 piston rod
16 telescopic tube
17 saddle clamp
18 frame
19 sliding block coupling part
20 groove telescopic tube
21 radial projection toothed rack
22 radial groove coupling part
23 head toothed rack
24 head sleeve
25 radial groove sleeve
26 radial projection coupling part
27 sliding block telescopic tube
28 sliding block cylinder
29 support tube
30 groove support tube
31 head telescopic unit

The invention claimed is:

1. A telescopic seatpost for mounting a bicycle saddle, the seatpost comprising:
a support unit to be fixed to a frame of a bicycle,
a telescopic unit moveably guided within a predetermined telescopic range relative to the support unit, wherein the telescopic range extends from a minimum longitudinal extent of the seatpost to a maximum longitudinal extent of the seatpost, the telescopic unit having a first end to support a bicycle saddle thereon,
a coupling device arranged beween the telescopic unit and the support unit, the coupling device including:
coupling part fixedly connected to the support unit, and the telescopic unit being coupled to the support unit by the coupling device, and
an adjustment mechanism configured to adjust the maximum longitudinal extent of the seatpost, the adjustment mechanism including an elongated adjustment part having a first end mounted to the first end of the telescopic unit, and the adjustment part being adjustably lockable to the coupling part at a plurality of positions along a longitudinal axis of the adjustment part so as to adjust a distance between the first end of the telescopic unit and the support unit, and thereby adjust the maximum longitudinal extent of the seatpost,
wherein the coupling device is configured to transmit an axial force acting on the telescopic unit to the support unit, and
a blocking device configured to releasably block a guided telescopic movement of the telescopic unit relative to the support unit.

2. The telescopic seatpost as set forth in claim 1, wherein the adjustment part is configured to couple the telescopic unit to the support unit at at least two different coupling positions.

3. The telescopic seatpost as set forth in claim 1, wherein the telescopic unit has a tubular configuration, and the support unit and/or the coupling device is at least partially arranged within the telescopic unit.

4. The telescopic seatpost as set forth in claim 1, wherein;
the adjustment part has a profiled notching, and
the coupling part has a corresponding profiled notching to achieve a positively locking connection of the telescopic unit to the support unit.

5. The telescopic seatpost as set forth in claim 4, wherein:
the profiled notching of the adjustment part is formed as a thread or as radial grooves or radial projections, and/or
the corresponding profiled notching in the coupling part is formed as a thread or as radial grooves or radial projections.

6. The telescopic seatpost as set forth in claim 5, wherein:
the profiled notching of the adjustment part is formed as peripherally limited radial grooves or radial projections, and/or
the profiled notching in the coupling part is formed as peripherally restricted radial grooves or radial projections.

7. The telescopic seatpost as set forth in claim 4, wherein the adjustment part is mounted rotatably to the telescopic unit, and the telescopic unit is coupled to the support unit by a rotary movement of the adjustment part relative to the coupling part.

8. The telescopic seatpost as set forth in claim 7, wherein the adjustment part is mounted rotatably in an inner region of the tubular telescopic unit.

9. The telescopic seatpost as set forth in claim 8, wherein the adjustment part is arranged coaxially with the telescopic unit.

10. The telescopic seatpost as set forth in claim 1, wherein the telescopic unit has an axial and/or radial opening, the opening being configured so that the coupling device is actuable from outside the telescopic unit.

11. The telescopic seatpost as set forth in claim 10, wherein the opening is configured so that the coupling device is actuable from outside the telescopic unit by a lever.

12. The telescopic seatpost as set forth in claim 4, wherein the coupling part is mounted non-rotatably to the support unit.

13. The telescopic seatpost as set forth in claim 4, wherein the adjustment part comprises a sleeve, a spindle, or a toothed rack.

14. The telescopic seatpost as set forth in claim 1, wherein the telescopic unit has an axial and/or radial opening, and the adjustment part of the adjustment mechanism is rotatable relative to the telescopic unit through the axial and/or radial opening.

15. The telescopic seatpost as set forth in claim 1, wherein the coupling device is actuable to adjust the maximum longitudinal extent of the seatpost independently of an operation of the blocking device to releasably block the guided telescopic movement of the telescopic unit relative to the support unit.

16. The telescopic seatpost as set forth in claim 1, wherein the guided telescopic movement of the telescopic unit relative to the support unit is a positively guided translatory telescopic movement restricted by the predetermined telescopic range.

17. The telescopic seatpost as set forth in claim 1, wherein the blocking device is hydraulic.

18. The telescopic seatpost as set forth in claim 1, wherein the support unit has a fixing device configured to connect the telescopic seatpost to a frame of a bicycle.

19. The telescopic seatpost as set forth in claim 18, wherein the fixing device is configured to connect the telescopic seatpost in a positively locking relationship to the frame of the bicycle.

20. The telescopic seatpost as set forth in claim 1, wherein the blocking device has a force storage member.

21. The telescopic seatpost as set forth in claim 20, wherein the force storage member is a pneumatic force storage member.

* * * * *